(12) United States Patent
Zhang

(10) Patent No.: US 9,300,925 B1
(45) Date of Patent: Mar. 29, 2016

(54) MANAGING MULTI-USER ACCESS TO CONTROLLED LOCATIONS IN A FACILITY

(71) Applicant: Jack Ke Zhang, Ijamsville, MD (US)

(72) Inventor: Jack Ke Zhang, Ijamsville, MD (US)

( * ) Notice: Subject to any disclaimer, the term of this patent is extended or adjusted under 35 U.S.C. 154(b) by 0 days.

(21) Appl. No.: 14/703,291

(22) Filed: May 4, 2015

(51) Int. Cl.
H04B 3/00 (2006.01)
H04N 7/18 (2006.01)

(52) U.S. Cl.
CPC .................................. H04N 7/181 (2013.01)

(58) Field of Classification Search
CPC ..... A61J 7/0481; G04G 11/00; G06F 19/323; G06F 19/3418; G06F 19/3456
See application file for complete search history.

(56) References Cited

U.S. PATENT DOCUMENTS

| | | | |
|---|---|---|---|
| 5,827,180 A | 10/1998 | Goodman et al. | |
| 6,075,755 A | 6/2000 | Zarchan | |
| 6,443,906 B1 | 9/2002 | Ting et al. | |
| 7,162,368 B2 | 1/2007 | Levi et al. | |
| 7,242,306 B2 | 7/2007 | Wildman et al. | |
| 7,285,090 B2 | 10/2007 | Stivoric et al. | |
| 8,217,795 B2 | 7/2012 | Carlton-Foss | |
| 8,457,367 B1 * | 6/2013 | Sipe et al. | 382/118 |
| 8,461,988 B2 | 6/2013 | Tran | |
| 8,708,903 B2 | 4/2014 | Tran | |
| 8,952,818 B1 | 2/2015 | Zhang et al. | |
| 2002/0026330 A1 | 2/2002 | Klein et al. | |
| 2003/0052787 A1 | 3/2003 | Zerhusen et al. | |
| 2003/0060721 A1 | 3/2003 | Nakazawa et al. | |
| 2003/0176815 A1 | 9/2003 | Baba et al. | |
| 2003/0212379 A1 | 11/2003 | Bylund et al. | |
| 2004/0077934 A1 | 4/2004 | Massad | |
| 2005/0089197 A1 * | 4/2005 | Iwasaki et al. | 382/115 |
| 2005/0101845 A1 | 5/2005 | Nihtila et al. | |
| 2007/0197878 A1 | 8/2007 | Shklarski | |
| 2007/0257636 A1 | 11/2007 | Phillips et al. | |
| 2008/0086318 A1 | 4/2008 | Gilley et al. | |
| 2008/0129518 A1 | 6/2008 | Carlton-Foss | |
| 2008/0162192 A1 | 7/2008 | Vonk et al. | |

(Continued)

FOREIGN PATENT DOCUMENTS

| | | |
|---|---|---|
| JP | 2007505412 | 3/2007 |
| KR | 1020020013214 | 2/2002 |

OTHER PUBLICATIONS

World's 1$^{st}$ Wi-Fi Blood Pressure Monitor. [online] BlipCare, Feb. 4, 2013. Retrieved from the Internet's Wayback Machine: <http://www.blipcare.com/blip-bp.html>.

(Continued)

*Primary Examiner* — Heather Jones
*Assistant Examiner* — Md Haque
(74) *Attorney, Agent, or Firm* — Kilpatrick Townsend & Stockton LLP

(57) ABSTRACT

A method or system for multi-user access of a facility including multiple controlled locations is disclosed. In one step, an image of a person is obtained from a data store. An image capture device is correlated to a controlled location. An image is received for the controlled location. One or more sub-images of the image are determined. At least one of the sub-images is compared with the image of the person. Information is retrieved for the person and a control rule is retrieved for the controlled location. The system determines whether the person is allowed to access the controlled location. Depending on the determination, the system then sends a signal indicating access availability to the controlled location for the person.

20 Claims, 10 Drawing Sheets

(56) References Cited

U.S. PATENT DOCUMENTS

| | | |
|---|---|---|
| 2008/0266118 A1 | 10/2008 | Pierson et al. |
| 2009/0187121 A1 | 7/2009 | Evans et al. |
| 2009/0252311 A1 | 10/2009 | Kuiken |
| 2009/0318779 A1 | 12/2009 | Tran |
| 2009/0322513 A1 | 12/2009 | Hwang et al. |
| 2009/0322540 A1 | 12/2009 | Richardson et al. |
| 2009/0322548 A1 | 12/2009 | Gottlieb et al. |
| 2010/0010428 A1 | 1/2010 | Yu et al. |
| 2010/0076331 A1 | 3/2010 | Chan et al. |
| 2010/0152548 A1 | 6/2010 | Koski |
| 2010/0194572 A1 | 8/2010 | Chan et al. |
| 2011/0093296 A1 | 4/2011 | Klink |
| 2011/0230733 A1 | 9/2011 | Al-Ali et al. |
| 2011/0263950 A1 | 10/2011 | Larson et al. |
| 2012/0274464 A1* | 11/2012 | Sweeney et al. ......... 340/539.13 |
| 2013/0127980 A1* | 5/2013 | Haddick et al. ............ 348/14.08 |
| 2013/0169431 A1 | 7/2013 | Alhuwaishel et al. |
| 2013/0310658 A1 | 11/2013 | Ricks et al. |
| 2013/0318027 A1* | 11/2013 | Almogy et al. ................. 706/52 |
| 2013/0345530 A1 | 12/2013 | McRoberts et al. |
| 2014/0052464 A1 | 2/2014 | Ray et al. |
| 2014/0163400 A1 | 6/2014 | Khanuja |
| 2014/0247361 A1* | 9/2014 | Sarwar et al. ................. 348/156 |
| 2014/0275928 A1 | 9/2014 | Acquista et al. |
| 2014/0276552 A1 | 9/2014 | Nguyen, Jr. et al. |
| 2014/0375246 A1 | 12/2014 | Boysen, III et al. |
| 2014/0378786 A1 | 12/2014 | Hong et al. |

OTHER PUBLICATIONS

U.S. Appl. No. 14/218,821, filed Mar. 18, 2014, Titled: Techniques for Monitoring Prescription Compliance Using a Body-Worn Device.

U.S. Appl. No. 14/565,373, filed Dec. 9, 2014, Titled: Techniques for Power Source Management Using a Wrist-Worn Device.

U.S. Appl. No. 14/565,384, filed Dec. 9, 2014, Titled: Techniques for Near Real Time Wellness Monitoring Using a Wrist-Worn Device.

U.S. Appl. No. 14/591,782, filed Jan. 7, 2015, Titled: Emergency Detection and Alert Apparatus With Floor Elevation Learning Capabilities.

U.S. Appl. No. 14/661,834, filed Mar. 18, 2015, Titled: Techniques for Emergency Detection and Emergency Alert Messaging.

* cited by examiner

MANAGING MULTI-USER ACCESS TO CONTROLLED LOCATIONS IN A FACILITY

BACKGROUND

This disclosure relates in general to managing multi-user access, but not by way of limitation, to systems and methods that are used to manage multi-user access in a facility using image capture devices.

In the United States, it is estimated that 765,000 people nationwide live in assisted living facilities. Many of the elderly living in assisted living still have mobility and require minimal supervision, while some suffer from dementia, Alzheimer's, and other mind-altering disorders or require heightened care. Monitoring a patient's whereabouts may be difficult as some patients may forget to wear, or prefer not to wear, tracking devices. Additionally, such facilities often have many visitors. These visitors may inadvertently allow an elderly person to access areas that he or she should be restricted from accessing.

Incarceration facilities face similar monitoring drawbacks. There are several million people residing in U.S. state and federal prisons. Inmates are monitored closely, but monitoring an inmate's whereabouts may be difficult as inmates may attempt to tamper with tracking devices. Improving the ability to track these inmates, as well as manager access to portions of the facility, may result in fewer staffing needs for the facility.

Current techniques are lacking with respect to monitoring multi-user access in a facility. For example, a guard may have to identify a person before allowing the person to enter or leave a portion of a facility. These types of procedures invite higher staffing and managerial costs for the facility manager resulting in higher costs for the elderly in assisted living. Likewise, taxpayers bear higher costs related to staffing and managerial costs for our incarceration facilities.

SUMMARY

In an example embodiment, the present disclosure provides systems and methods for multi-user access in a facility. In an example environment, the present disclosure provides a system for managing user-access of a facility, where the facility includes a number of controlled locations. A "controlled location," as used herein, is intended to refer to an area, an access point, a door, a window, an elevator, or any suitable location for which access may be restricted. The multi-user access system comprises a data store, wherein the data store comprises a first image of a first person and a second image of a second person. The multi-user access system further comprises an image capture devices wherein the image capture devices corresponds to a controlled location and the image capture devices transmits an image for the controlled location of the facility, wherein the image records a plurality of people. The multi-user access system further comprises an image process engine that determines a plurality of sub-images corresponding to the plurality of people in the image, wherein the plurality of sub-images includes a first sub-image and a second sub-image, The image processor engine further compares the first sub-image to the first image of the first person and compares the second sub-image to the second image of the second person. The image processor engine further determines, using a machine image processing algorithm, that the first sub-image matches the first image of the first person. The image processor engine further determines, using the machine image processing algorithm, that the second sub-image matches the second image of the second person. The multi-user access system further comprises a user-access engine that retrieves first information for the first person and retrieves second information for the second person. The user-access engine further retrieves a control rule for the controlled location. The user-access engine further determines whether the first and second persons are allowed to access the controlled location, wherein the determining is a function of the first information, the second information, and the control rule. The user-access engine further sends a signal indicating access availability to the controlled location for the first and second persons.

In another example environment, the present disclosure provides a computer-implemented method for managing user-access of a facility, where the facility includes a number of controlled locations. The method may include obtaining a two-dimensional image of a person from a data store. The method may further include correlating an image capture device with a controlled location. The method may further include receiving, from an image capture device, an image for the controlled location of the facility, the image recording one or more people. The method may further include determining one or more sub-images corresponding to the one or more people in the image. The method may further include comparing at least one of the one or more sub-images to the two-dimensional image of the person. The method may further include determining, using a machine image processing algorithm, that the one or more people match the two-dimensional image of the person. The method may further include retrieving information for the person and retrieving a control rule for the controlled location. The method may further include determining whether the person is allowed to access the controlled location, wherein the determining is a function of the information and the control rule. The method may further include sending a signal indicating access availability to the controlled location for the person based upon the immediately preceding determining.

In yet another example embodiment, the present disclosure provides a computer-implemented method for managing multi-user access of a facility, where the facility has a plurality of controlled locations with a corresponding plurality of image capture devices. The method may include obtaining a first image of a first person from a data store and obtaining a second image of a second person from the data store. The method may further include correlating an image capture device with a controlled location. The method may further include receiving, from the image capture device, an image for the controlled location of the facility, the image recording a plurality of people. The method may further include determining a plurality of sub-images corresponding to the plurality of people in the image, wherein the plurality of sub-images includes a first sub-image and a second sub-image. The method may further include comparing the first sub-image to the first image of the first person. The method may further include comparing the second sub-image to the second image of the second person. The method may further include determining, using a machine image processing algorithm, that the first sub-image matches the first image of the first person. The method may further include determining, using the machine image processing algorithm, that the second sub-image matches the second image of the second person. The method may further include retrieving first information for the first person. The method may further include retrieving second information for the second person. The method may further include retrieving a control rule for the controlled location. The method may further include determining whether the first and second persons are allowed to access the controlled location, wherein the determining is a function of the first information, the second information and the control rule. The method may further include sending a signal indicating access availability to the controlled location for the person based upon the immediately preceding determining.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
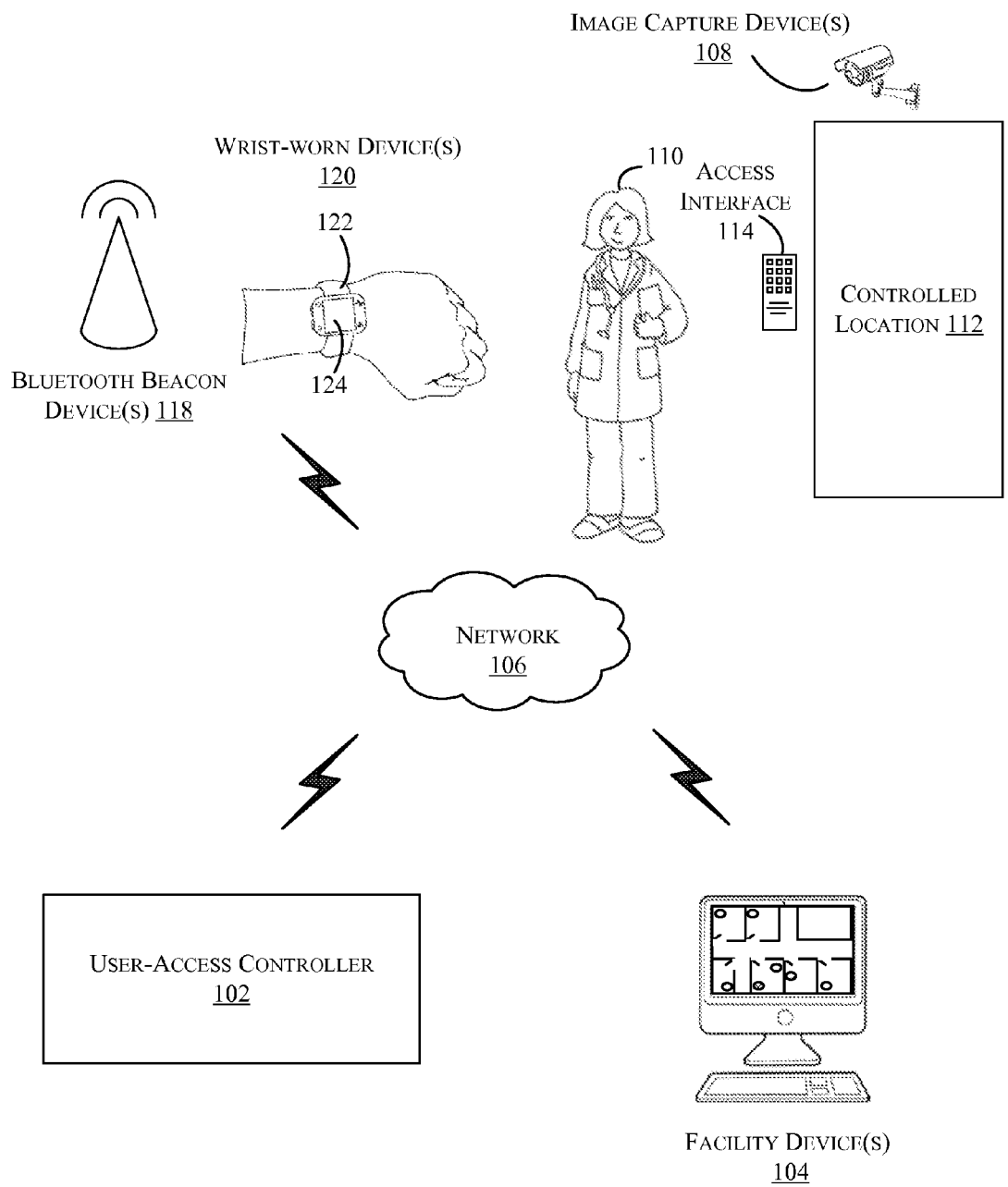
FIG. 1 depicts an example environment of an embodiment of a multi-user access system for managing user access for a facility, in accordance with at least one embodiment.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims. Specific details are given in the following description to provide a thorough understanding of the embodiments. However, it will be understood by one of ordinary skill in the art that the embodiments may be practiced without these specific details.

As described in the background of this disclosure, embodiments of the present invention comprise systems and methods for managing multi-user access for a facility. Specifically, these methods include the use of one or more image capture devices placed at, or substantially near, a controlled location. A "controlled location," as used herein, is intended to refer to an area, an access point, a door, a window, an elevator, or any suitable location for which access may be restricted. An "image capture device" may include, but is not limited to, a digital camera, a video recorder, a still-image camera, or the like. Additionally, or alternatively, one or more Bluetooth beaconing devices may be utilized within the facility to manage user access of the facility. A "Bluetooth beaconing device," as used herein is meant to refer to a positioning system that utilizes a Bluetooth protocol to enable a smart phone or other device to perform actions (e.g., respond with locational data of the device) when in relatively close proximity to the Bluetooth beaconing device.

In accordance with at least one embodiment, one or more wrist-worn devices may be utilized within the facility to manage user access of the facility. For example a wrist-worn device may include a wristband monitoring device and a faceplate device. The wrist-worn device may be adaptable as a dual device with either the wristband monitoring device or the faceplate device able to be operational while the other device is charging. The wrist-worn device may include one or many sensors that may be used to track vital signs and/or locational information of the patient. As used herein, a "sensor" may comprise at least one of an accelerometer, a gyroscope, a blood-oxygen sensor, a thermometer, a heart-rate monitor, a blood pressure monitor, a glucose monitor, a global positioning system (GPS) device, a pedometer, or an altimeter. The wrist-worn device may operate as a watch. Additionally, the wrist-worn device may be capable of presenting a notification to the user. A notification may be audible, haptic, graphical, or textual in nature. The wrist-worn device may include a wristband monitoring device connected to a faceplate device for caring out the features described herein. The wristband monitoring device has a number of sensors located on the band to measure various vital signs, and visual indicators (e.g., LED lights) to indicate charging and sensor activation. The faceplate device includes a number of sensors, a wireless transmitter, a battery charger, and a user interface (e.g., a touch screen) for interacting with the user and remote systems. It should be understood that any reference herein directed to a "wrist-worn device" or "wrist-worn device(s)" may alternatively be considered to refer to one or more body-worn devices, not necessarily worn on the wrist (e.g., on the ankle, attached to a belt and worn around the waist, etc.).

Generally speaking, embodiments of the present invention enable management of multi-user access to controlled locations of a facility. Additionally, these embodiments enable managing access as well as ongoing tracking of multiple users within controlled locations of the facility. It should be understood that examples included herein describing combined usage of image capture devices, wrist-worn devices, Bluetooth beaconing devices, and/or RFID tags/readers may instead utilize any suitable combination of the above, including individually. In accordance with at least one embodiment, identifying and/or tracking users in a facility does not require the user to wear any electronic device. It should be understood that, with respect to any or all example embodiments included herein, functionality descriptions directed to utilizing image capture device(s), and/or Bluetooth beaconing device(s), and/or wrist-worn device(s), and/or RFID readers may be omitted in one or more embodiments.

In accordance with at least one embodiment, a user (e.g., visitors, employees, independent contractors, etc.) enters a facility. Upon entry, or at another suitable time, a user may be required by facility staff to register with the multi-user access system. In some embodiments, registration may include capturing an image of the user. For example, a digital camera at a registration station, communicating with a device operated by the facility, may be utilized to take a front and/or profile image of the user. Such images may be communicated to a multi-user access system (e.g., for storage and/or for further processing). Additional information of the user may be stored, for example, access authority information including, but not limited to, a two-dimensional image of a user, a user role, a controlled location that the user is allowed to access, a controlled location that the user is restricted from accessing, a person within the facility who is associated with the user (e.g., a person the user is visiting, a doctor/patient relationship, etc.), a person that the user may escort to any suitable controlled location that the user is allowed to access, a person to which the user is restricted from having access, or any suitable combination of the above.

In at least one example, one or more image capture devices are placed within one or more controlled locations of a facility (e.g., an assisted living facility, a hospital, a prison, a school, a shopping center, a doctor's office, a pharmacy, a bank, etc.). An image capture device may be placed at an access point of a controlled location (e.g., a door, a window, etc.), within a controlled location (e.g., a room, an outside garden, a hallway, a nurse's station, etc.), or substantially near a controlled location and/or an access point of a controlled location. Users that enter the facility may approach an image capture device. The image capture device may capture an image of the user. The image may be received by a system responsible for managing multi-user access of the facility. Upon receipt of the image, the system may analyze the image using one or more machine image processing algorithms. As used herein, a "machine image processing algorithm" is intended to include, but is not limited to, one or more algorithms for analyzing images, the algorithms include operations related to feature extraction, pattern recognition, multi-scale signal analysis, projection, classification, pixilation, linear filtering, principal components analysis, independent component analysis, hidden Markov models, anisotropic diffusion, partial differential equations, self-organizing maps, neural networks, wavelets, or the like. A machine image processing algorithm may be used to determine a number of sub-images (e.g., an image of a face, an image of a badge, an image of an article of clothing, etc.) from the captured image of the user.

In accordance with at least one embodiment, the sub-images of the image may be compared to stored images of users registered with the system. If the comparison results in a match, access authority information may be retrieved for the user. Such access authority information may indicate that the user is allowed to access (e.g., pass through) the controlled location (e.g., the door). Upon such indication, the system may cause a signal to be sent indicating access availability to the controlled location for the user. Such a signal may cause a door/window/gate to open/close/unlock/lock, enable elevator calling, or the like. In at least one example, the signal may suppress a notification, reminder, alert, alarm, or the like. The signal may be an electronic signal that indicates instructions for the controlled location to perform an action.

In accordance with at least one embodiment, multiple people may be captured in an image. In such cases, one or more sub-images for each person may be determined. The identity of each person in the image may be determined by comparing the one or more sub-images of each person to stored images of registered users. Upon determining the identity of a person, access authority information may be used to determine whether the person is allowed access to the controlled location. In at least some examples, if the user is not found in the system, then the person may be allowed to access all, or some subset of the controlled locations by default.

In accordance with at least one embodiment, one person's access authority may override another person(s) access authority. For example, during registration, or at another suitable time, a doctor may be associated with one or more of her patients. At some point, the doctor may attempt to escort the patient into an area to which, normally, the patient does not have access, but to which the doctor does. In this case, both the doctor and the patient can be determined from a captured image at, for example, the door. While access to the door would normally be restricted (e.g., locked) for the patient, the presence of the doctor, along with the association of the doctor to her patient, may result in the door being accessible to both the doctor and the patient.

In accordance with at least one embodiment, multiple users in a facility may be tracked by the system. For example, one or more image capture devices may capture various images of a person in the facility, at various times. A number of sub-images may be determined from the various images. As a non-limiting illustrative example, an image may indicate a user (e.g., a nurse) is at a nurse's station within the facility. At substantially the same time, an image may indicate, falsely, that the same nurse is at a door to a controlled location. In such examples, or at any suitable time, confidence scores may be calculated based on the machine image processing algorithm, where a confidence score indicates a degree of likelihood that the person in the sub-image is a particular person. A comparison of the confidence scores may result in the person at the controlled location being denied access (e.g., when the confidence score of the image depicting the nurse at the desk is higher than the confidence score of the image depicting the nurse at the controlled location). Additionally, or alternatively, a notification and/or an alarm may be triggered based on the determination that the same person is at two different locations in the facility at substantially the same time.

In accordance with at least one embodiment, a person may be tracked through the facility by the system. For example, one or more image capture devices may capture various images of a person in the facility, at various times. A number of sub-images may be determined from the various images. As a non-limiting illustrative example, an image may indicate a user (e.g., a nurse) is at a nurse's station within the facility. At another time, (e.g., seconds later) another image may indicate that the nurse is moving toward a hallway of the facility. In this example, the hallway may not have any image capture devices nearby, thus, the nurse's progress down the hallway is unattainable through image captures. In such cases, the system may calculate a potential location of the nurse based on, for example, a calculated speed at which the nurse appears to be moving, a calculated heading to which the nurse appears to be headed, an electronic floor plan of the facility, or the like. In some cases, the system may monitor for the user to be reappear at another controlled location of the facility within a time period. If the user does not reappear with the time period, a notification and/or alarm may be triggered. In at least some examples, a Bluetooth beaconing device and/or a wrist-worn device as described above may be utilized independently from, or in conjunction with, image capture devices. For example, Bluetooth beaconing devices and/or wrist-worn devices may enable the system to ascertain location information of a user. Such location information may be utilize to identify one or more persons in an image (e.g., if the person is otherwise unidentifiable) and/or may be stored for later use.

Referring now to the drawings, in which like reference numerals represent like parts, FIG. 1 depicts an example environment 100 of an embodiment of a user-access controller 102 for managing user access for a facility, in accordance with at least one embodiment. In at least one embodiment, the user-access controller 102 is a component of the a system for managing multi-user access in a facility. The facility device(s) 104 may communicate with user-access controller 102 via network(s) 106. In some examples, the network(s) 106 include any one or a combination of many different types of networks, such as cable networks, the Internet, wireless networks, cellular networks and other private and/or public networks. The facility device(s) 104 may be responsible for displaying electronic representations of the facility and/or electronic representations of one or more users inside/outside the facility. For example, a security guard may utilize the facility device(s) 104 to view one or more persons within the facility.

In accordance with at least one embodiment, image capture device(s) 108 may communicate via a wireless and/or wired connection with user-access controller 102 to provide images of the facility via the network(s) 106. These images may be analyzed by user-access controller 102 to determine one or more actual and/or potential locations of user 110. Upon determining a user's identify, user-access controller 102 may send a signal to controlled location 112 that enables the one or more user(s) 110 to access the controlled location. Alternatively, the one or more user(s) 110 may utilize an access interface(s) 114 (e.g., a keypad, a radio frequency identification (RFID) reader, a graphical interface presented on a wrist-worn device, etc.) to override the determination of access of user-access controller 102. For example, user-access controller 102 may determine that a particular user is not allowed to access the controlled location 112. Using the access interface(s) 114, the particular user may enter an override (e.g., by typing in a code, presenting an RFID tag, etc.) in order to gain access to the controlled location 112.

In at least one embodiments wrist-worn device(s) 120 and/or Bluetooth beacon device(s) 118 may be utilized in conjunction with the image capture device(s) to track the one or more user(s) 110 of the facility. The wrist-worn device(s) 120 may include a wristband monitoring device 122 and a faceplate device 124. The wrist-worn device(s) 120 may exchange cellular network control, timing and status information with a cellular network access point so as to maintain communication capabilities in the cellular network. Cellular network access points may provide access to the internet or other data networks. The wrist-worn device(s) 120 may establish an internet connection by detecting a cellular access point, performing joining procedures, and regularly exchanging status, control and routing information with the access point. The wrist-worn device(s) 120 may use the internet connection to access weather data, GPS data, or to communicate with other devices described herein.

Figure 2:
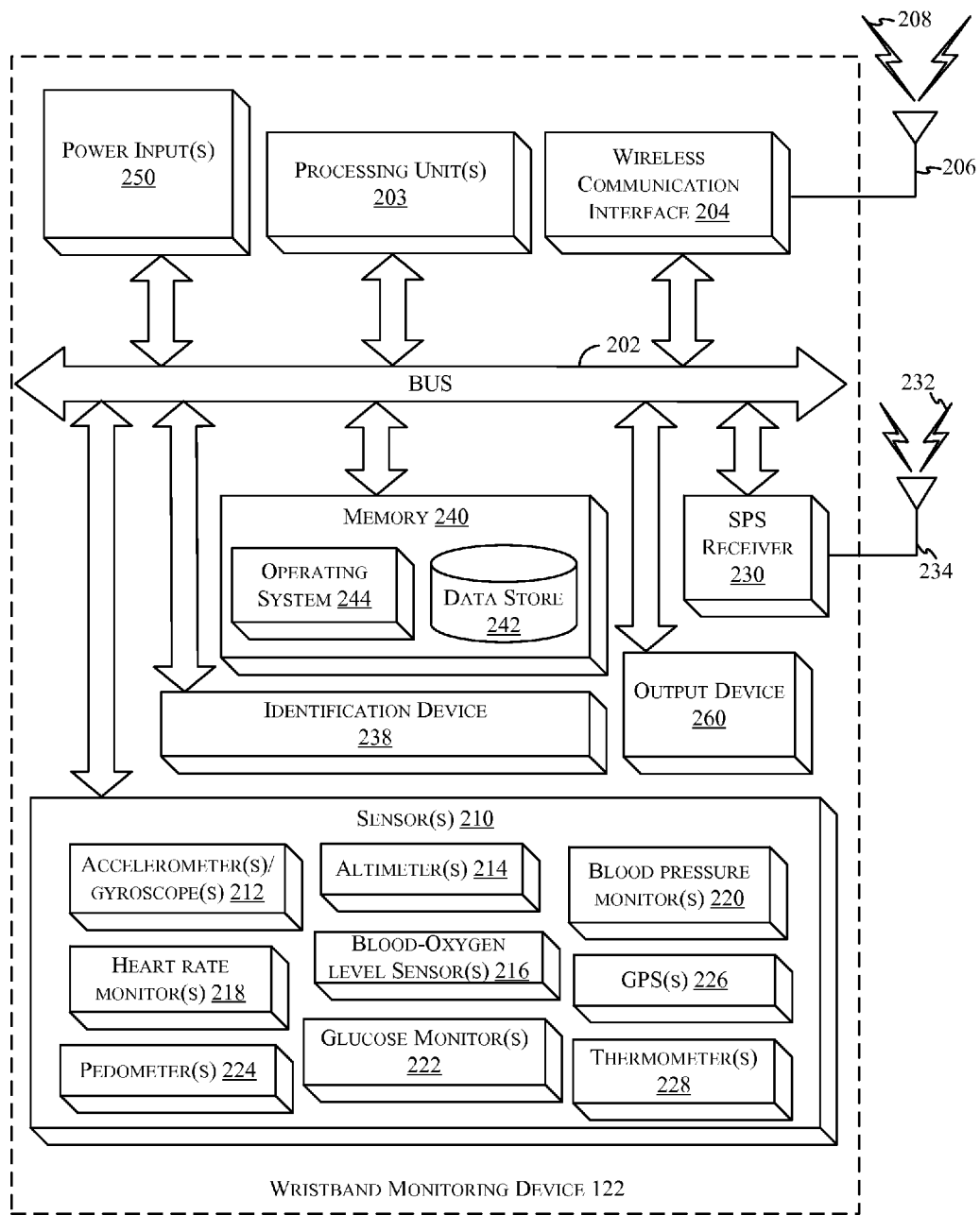
FIG. 2 depicts an example wristband monitoring device of the wrist-worn device, in accordance with at least one embodiment.

FIG. 2 depicts an example of the wristband monitoring device 122 of the wrist-worn device(s) 120, in accordance with at least one embodiment. It should be noted that FIG. 2 is meant only to provide a generalized illustration of various components, any or all of which may be utilized as appropriate. In some embodiments, some or all of the components included in the wristband monitoring device 122 may also or instead be located on the faceplate device 124. Moreover, system elements may be implemented in a relatively separated or relatively more integrated manner.

The wristband monitoring device 122 is shown comprising hardware elements that can be electrically coupled via a bus 202 (or may otherwise be in communication, as appropriate). The hardware elements may include a processing unit(s) 203 which can include without limitation one or more general-purpose processors, one or more special-purpose processors (such as digital signal processors (DSPs), application specific integrated circuits (ASICs), and/or the like), and/or other processing structure or means, which can be configured to perform one or more of the methods described herein.

The wristband monitoring device 122 might also include a wireless communication interface 204, which can include without limitation a modem, a network card, an infrared communication device, a wireless communication device, and/or a chipset (such as a Bluetooth device, an IEEE 802.11 device, an IEEE 802.15.4 device, a Wi-Fi device, a WiMax device, cellular communication facilities, etc.), and/or the like. The wireless communication interface 204 may permit data to be exchanged with a network, wireless access points, other computer systems, and/or any other electronic devices described herein. The communication can be carried out via one or more wireless communication antenna(s) 206 that send and/or receive wireless signals 208. In at least one embodiment, wristband monitoring device 122 may communicate with faceplate device 124 via the wireless communication interface 204.

Depending on desired functionality, the wireless communication interface 204 can include separate transceivers to communicate with base transceiver stations (e.g., base transceiver stations of a cellular network) and access points. These different data networks can include, an Orthogonal Frequency-Division Multiple Access (OFDMA), Code Divisional Multiple Access (CDMA), Global System for Mobile Communications (GSM)), and/or other types of networks.

The wristband monitoring device 122 can further include sensor(s) 210. Such sensors can include, without limitation, one or more accelerometer(s) and/or gyroscope(s) 212, altimeter(s) 214, blood-oxygen level sensor(s) 216, heart rate monitor(s) 218, blood pressure monitor(s) 220, glucose monitor(s) 222, pedometer(s) 224, GPS(s) 226, thermometer(s) 228, and the like. At least a subset of the sensor(s) 220 can provide readings used to provide wellness monitoring as described herein.

Embodiments of wristband monitoring device 122 may also include a Satellite Positioning System (SPS) receiver 230 capable of receiving signals 232 from one or more SPS satellites using an SPS antenna 234. Such positioning can be utilized to complement and/or incorporate the techniques described herein. The SPS receiver can receive satellite data that can be transmitted to the GPS sensor 226. The satellite data can be information sufficient to allow the GPS sensor 226 to determine a geographic location of the wristband monitoring device based on the satellite data. It can be noted that, as used herein, an SPS may include any combination of one or more global and/or regional navigation satellite systems and/or or augmentation systems, and SPS signals may include SPS, SPS-like, and/or other signals associated with such one or more SPS.

Embodiments of wristband monitoring device 122 may also include an identification device 238. Identification device 238 may include a device that utilizes radio-frequencies in communication (e.g., a radio-frequency identification (RFID) device). A RFID device is a device that uses electromagnetic fields to transfer data for the purposes of automatically identifying and tracking tags attached to objects, the tags containing electronically stored information. Other identification devices may be utilized, including, but not limited to devices utilizing near field communication (NFC). NFC is a set of standards used by smartphone and similar devices to establish radio communication with each other by touching them together or bring them into proximity of one another.

The wristband monitoring device 122 may further include, or be in communication with, a memory 240. The memory 240 is an example of a computer-readable storage media. In at least one example, computer-readable storage media include volatile or non-volatile, removable or non-removable, media implemented in any method or technology for storage of information such as computer-readable instructions, data structures, program modules, or other data. Additional types of computer storage media that may be included in the wristband monitoring device 122 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the wristband monitoring device 122. Combinations of any of the above should also be included within the scope of computer-readable media. Memory 240 can further be used to store sensor data for any combination of sensors 210 in data store 242. Additionally, or alternatively the memory 240 may be used to store medical-related data for the user.

Turning to the contents of the memory 240 in more detail, the memory 240, in at least one embodiment, includes an operating system 244 and one or more application programs, modules, or services for implementing the features disclosed herein including at least the perceived latency, such as via the wristband monitoring device 122 or dedicated applications. In at least one example embodiment, the wristband monitoring device 122 is configured to receive, store, and/or display content and at least one interface for interacting with the service provider computer(s) 402 and/or user. Additionally, the memory 240 stores access credentials and/or other user information such as, but not limited to, user IDs, passwords, and/or other user information. In some examples, the user information includes information for authenticating an account access request such as, but not limited to, a device ID, a cookie, an IP address, a location, or the like. Additionally, the user information may include medical-related data associated with the user.

As used herein, medical-related data can include, for example, health information that is created or received by a health care provider, a processed or unprocessed version of medical data detected by medical equipment, and/or user-identified data. Medical-related data can include information that identifies a patient, such as personal information and/or demographic information. For example, the information can identify a patient's name, age, sex, race, physical address, phone number, email address and/or social security number. Medical-related data may include information collected by a health plan, a public health authority, an employer, a life insurer, a school or university, or a health care clearinghouse that relates to the past, present, or future physical or mental health or condition of any individual.

Medical-related data can include financial and/or insurance information corresponding to the patient. For example, the information can identify an insurance company, insurance plan, member identification number, group number, insurance contact information (e.g., address and/or phone number), deductible information, out-of-pocket information, copay information, an employer, an occupation and/or salary information.

Medical-related data can include medical-history information, such as past diagnoses, past or present symptoms or past procedures and/or corresponding dates (e.g., of diagnoses, symptom initiations and/or procedures). Medical-related data can identify past or present medications being taken by or having been prescribed to the patient and corresponding dates. In some examples, the medical-related data can identify orders pharmacology orders, whether associated with a patient, doctor, or otherwise.

Medical-related data can include an identification of one or more medical services being or having been requested by a patient. A medical service can include, for example, an evaluation performed by a medical care professional, a medical test, a surgery and/or other procedure. Medical-related data can identify a medical test or analysis that was performed or prescribed and/or a result of the test or analysis. For example, information can indicate that a test (e.g., lab test, MRI, x-ray, CT scan, echocardiography, EKG, EEG, EMG, or ultrasound) was performed on a particular date and/or by a particular entity and can further include a processed and/or unprocessed result of the test (e.g., a count or level; an indication as to whether a test result is normal; and/or an indication as to whether a particular feature (e.g., a fracture, tumor, lesion, slowed nerve conduction) was observed and/or a magnitude of the feature).

Medical-related data can identify one or more care providers or institutions. The care provider and/or institution can be one associated with recent or past care and/or with the patient. For example, data can be transmitted for a patient admitted in Hospital A and being treated by Specialist B, though the data can also identify that the patient's primary care physician is Doctor C.

Medical-related data can identify one or more emergency contacts or family members and contact data for the individuals. For example, medical-related data can identify that the patient's emergency contact is an adult child that may be contacted at a provided phone number.

Medical-related data can identify a patient healthcare directive. For example, medical-related data can identify if the patient has a living will, a do not resuscitate order (DNR), or if another individual has the right to make medical decisions relating to the patient's medical care.

Medical-related data may further include one or more authorized viewers. Authorized viewers are those that the user has agreed to allow access to his medical-related data. For example, a user may authorize a doctor, an individual having rights to make medical decision related to the patient's medical care, a medical institution, and the like to access his medical-related data. The user may indicate that the authorization is contingent on certain events transpiring (e.g., an emergency situation).

Medical-related data may, or may not, selectively pertain to a particular patient. For example, non-patient-specific data may include a price of a prescription, a recommended or approved dosing schedule for a medication, a work schedule for a physician, an acceptance criteria for a clinical study, Non-patient-specific data can include information pertaining to the operation of a medical care facility, financial information, administrative information, and generic clinical information.

Medical-related data can, depending on the implementation, include individually identifiable health information and/or de-identified information. Individually identifiable health information includes, for example, health information, including demographic information collected from an individual that is created or received by a health care provider, health plan, employer, or health care clearinghouse; and that relates to the past, present, or future physical or mental health or condition of an individual, the provision of health care to an individual, or the past, present, or future payment for the provision of health care to an individual; and that identifies the individual; or, with respect to which there is a reasonable basis to believe, can be used to identify the individual. De-identified information includes information that cannot be used on its own or with other information to identify a person to whom the information belongs. De-identified information can include normal ranges or values associated with various sensor data based on gender, age, or other classification. De-identified information can also include medical-related data aggregated from other wrist-worn device users or non-users related.

As used herein, medical-related data can include protected health information, which can include individually identifiable health information that is transmitted by electronic media, maintained in electronic media, or transmitted or maintained in any other form or medium. Examples of protected health information, include, for example any information about health status, provision of health care, or payment that can be linked to a particular patient and may include any of the following information capable of identifying the patient: names, geographic identifiers, dates directly relating to the patient, phone numbers, fax numbers, email addresses, social security numbers, medical record numbers, health insurance beneficiary numbers, account numbers, certificate/license numbers, vehicle identifiers and serial numbers, device identifiers and serial numbers, web Uniform Resource Locators, Internet Protocol addresses, biometric identifiers (e.g., finger, retinal, and voice prints), full face photographic images and any comparable images, and any other unique identifying number, characteristic, or code.

The memory 240 of the wristband monitoring device 122 also can comprise software elements (not shown), device drivers, executable libraries, and/or other code, such as one or more application programs, which may comprise computer programs provided by various embodiments, and/or may be designed to implement methods, and/or configure systems, provided by other embodiments, as described herein.

The wristband monitoring device 122 includes an output device 260. Output device 260 may include LED lights, speakers, or other visual or audible indicators. The output device 260 may be used to indicate when a sensor is activated, when a reading is being taken, when the wristband monitoring device 122 is being charged, when the wristband monitoring device 122 is low on battery, when Bluetooth is being utilized by the device, and the like.

The wristband monitoring device 122 includes a power source, and a means to charge said power source, indicated by power input(s) 250. In at least one embodiment, wristband monitoring device 122 may be connected to faceplate device 124 and the power source of the wristband monitoring device 122 may be charged from the battery of faceplate device 124. The power source may include a battery, a capacitor, or any other suitable means for storing chemical or electrical energy for later use.

Figure 3:
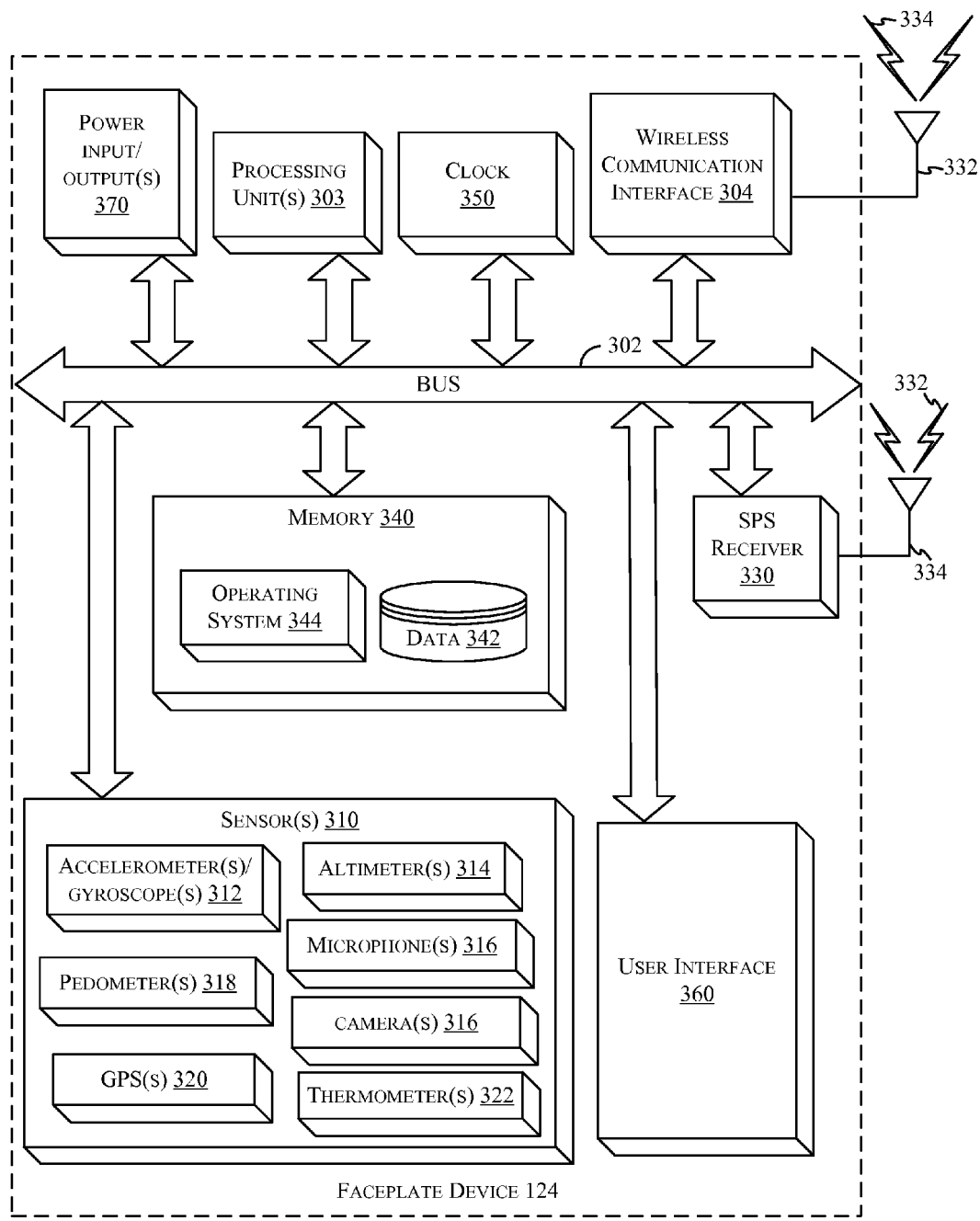
FIG. 3 depicts an example faceplate device of the wrist-worn device, in accordance with at least one embodiment.

FIG. 3 depicts an example faceplate device (e.g., the faceplate device 124) of the wrist-worn device(s) 120, in accordance with at least one embodiment. 124 can implement the techniques discussed herein. It should be noted that FIG. 3 is meant only to provide a generalized illustration of various components, any or all of which may be utilized as appropriate. In some embodiments, some or all of the components included in the faceplate device 124 may also or instead be located on the wristband monitoring device 122. Moreover, system elements may be implemented in a relatively separated or relatively more integrated manner.

The faceplate device 124 is shown comprising hardware elements that can be electrically coupled via a bus 302 (or may otherwise be in communication, as appropriate). The hardware elements may include a processing unit(s) 310 which can include without limitation one or more general-purpose processors, one or more special-purpose processors (such as digital signal processors (DSPs), application specific integrated circuits (ASICs), and/or the like), and/or other processing structure or means, which can be configured to perform one or more of the methods described herein.

The faceplate device 124 might also include a wireless communication interface 304, which can include without limitation a modem, a network card, an infrared communication device, a wireless communication device, and/or a chipset (such as a Bluetooth device, an IEEE 802.11 device, an IEEE 802.15.4 device, a WiFi device, a WiMax device, cellular communication facilities, etc.), and/or the like. The wireless communication interface 304 may permit data to be exchanged with a network, wireless access points, other computer systems, and/or any other electronic devices described herein (e.g. the wristband monitoring device 122). The communication can be carried out via one or more wireless communication antenna(s) 306 that send and/or receive wireless signals 308. For example, the wireless signals 308 can be cellular network signals or a Bluetooth connection. In at least one embodiment, wristband monitoring device 122 may communicate with faceplate device 124 via the wireless communication interface 304.

Depending on desired functionality, the wireless communication interface 304 can include separate transceivers to communicate with base transceiver stations (e.g., base transceiver stations of a cellular network) and access points. These different data networks can include, an Othogonal Frequency-Division Multiple Access (OFDMA), Code Divisional Multiple Access (CDMA), Global System for Mobile Communications (GSM), and/or other types of networks.

The faceplate device 124 can further include sensor(s) 310. Such sensors can include, without limitation, one or more accelerometer(s) and/or gyroscope(s) 312, altimeter(s) 314, microphone(s) 316, pedometer(s) 318, GPS(s) 320, thermometer(s) 322, and the like. At least a subset of the sensor(s) 310 can provide readings used to provide wellness monitoring as described herein.

Embodiments of wristband monitoring device 122 may also include a Satellite Positioning System (SPS) receiver 330 capable of receiving signals 332 from one or more SPS satellites using an SPS antenna 334. The SPS receiver can receive satellite data that can be transmitted to the GPS sensor 320. The satellite data can be information sufficient to allow the GPS sensor 320 to determine a geographic location of the wristband monitoring device based on the satellite data. Such positioning can be utilized to complement and/or incorporate the techniques described herein. It can be noted that, as used herein, an SPS may include any combination of one or more global and/or regional navigation satellite systems and/or augmentation systems, and SPS signals may include SPS, SPS-like, and/or other signals associated with such one or more SPS.

The faceplate device 124 may further include or be in communication with a memory 340. The memory 340 is an example of a computer-readable storage media. In at least one example, computer-readable storage media include volatile or non-volatile, removable or non-removable media implemented in any method or technology for storage of information such as computer-readable instructions, data structures, program modules, or other data. Additional types of computer storage media that may be included in the faceplate device 124 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the faceplate device 124. Combinations of any of the above should also be included within the scope of the memory 340 can further be used to store sensor data for any combination of sensors 310 in data store 342. Additionally, or alternatively the memory 340 may be used to store medical-related data for the user.

Turning to the contents of the memory 340 in more detail, the memory 340, in at least one embodiment, includes an operating system 344 and one or more application programs, modules, or services for implementing the features disclosed herein. In at least one example embodiment, the faceplate device 124 is configured to receive, store, and/or display content and at least one interface for interacting with the service provider computer(s) 402 and users. Additionally, the memory 340 stores access credentials and/or other user information such as, but not limited to, user IDs, passwords, and/or other user information. In some examples, the user information includes information for authenticating an account access request such as, but not limited to, a device ID, a cookie, an IP address, a location, or the like. Additionally, the user information includes information regarding a therapy associated with the user.

The memory 340 of the faceplate device 124 also can comprise software elements (not shown), device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more processes described with respect to the method(s) discussed above, such as the methods described in relation to FIGS. 6 and 7, might be implemented as code and/or instructions executable by the faceplate device 124 (and/or processing unit(s) 303 within a faceplate device 124) and/or stored on a non-transitory and/or machine-readable storage medium (e.g., a "computer-readable storage medium," a "machine-readable storage medium," etc.).

Faceplate device 124 may include clock 350. Clock 350 is used to generate a time stamp for each of the data observations generated by the sensors. The time stamps are used by the processing units 303 in the analysis of sensor data, and facilitate pattern recognition and improved capacity for determining the operational environment of the faceplate device 124 and wristband monitoring device 122. The clock 350 can also be used by the processing units 303 to for alarms and other standard clock functions.

The faceplate device 124 includes a user interface 360. User interface 360 may include a touchscreen, a button, a keypad interface, a vibration generator, a sound generator, and/or other similar interface. The interface facilitates soliciting information from the wearer and obtaining input data and information provided by the wearer in response.

The faceplate device 124, utilizing user interface 360, solicits information about the user or the user's condition or environment so as to analyze such data in order to provide the wellness monitoring features discussed herein. For example, the faceplate device 124 utilizes user inputs via user interface 360 to obtain information about the user's physique, lifestyle, health, activity level as well as information related to therapy compliance and other information relevant to ascertaining the user's overall wellness. The faceplate device 124 further solicits any inputs that may facilitate improved learning, analysis and sensing performed by the faceplate device 124, the wristband monitoring device 122, and/or other suitable devices or computers (e.g., service provider computer(s) 402).

The faceplate device 124 includes an energy source, a means to charge said energy source, and a means to charge an energy source located on wristband monitoring device 122, indicated by power input/outputs 370. The energy source may be a battery, a capacitor, or any other suitable means for storing chemical or electrical energy for later use. In at least one embodiment, the wristband monitoring device 122 may be connected to faceplate device 124 and the battery of the faceplate device 124 may charge the battery of wristband monitoring device 122. In some embodiments, the wristband monitoring device 122 may be connected to the faceplate device 124 and the battery of the faceplate device 124 may be the energy source for the wristband monitoring device 122 or vice versa. The faceplate device 124 may be configured to charge from a standard A/C adaptor, or by use of a charging dock (e.g., a charging cradle) configured to house the faceplate device 124, or other suitable charging means.

Figure 4:
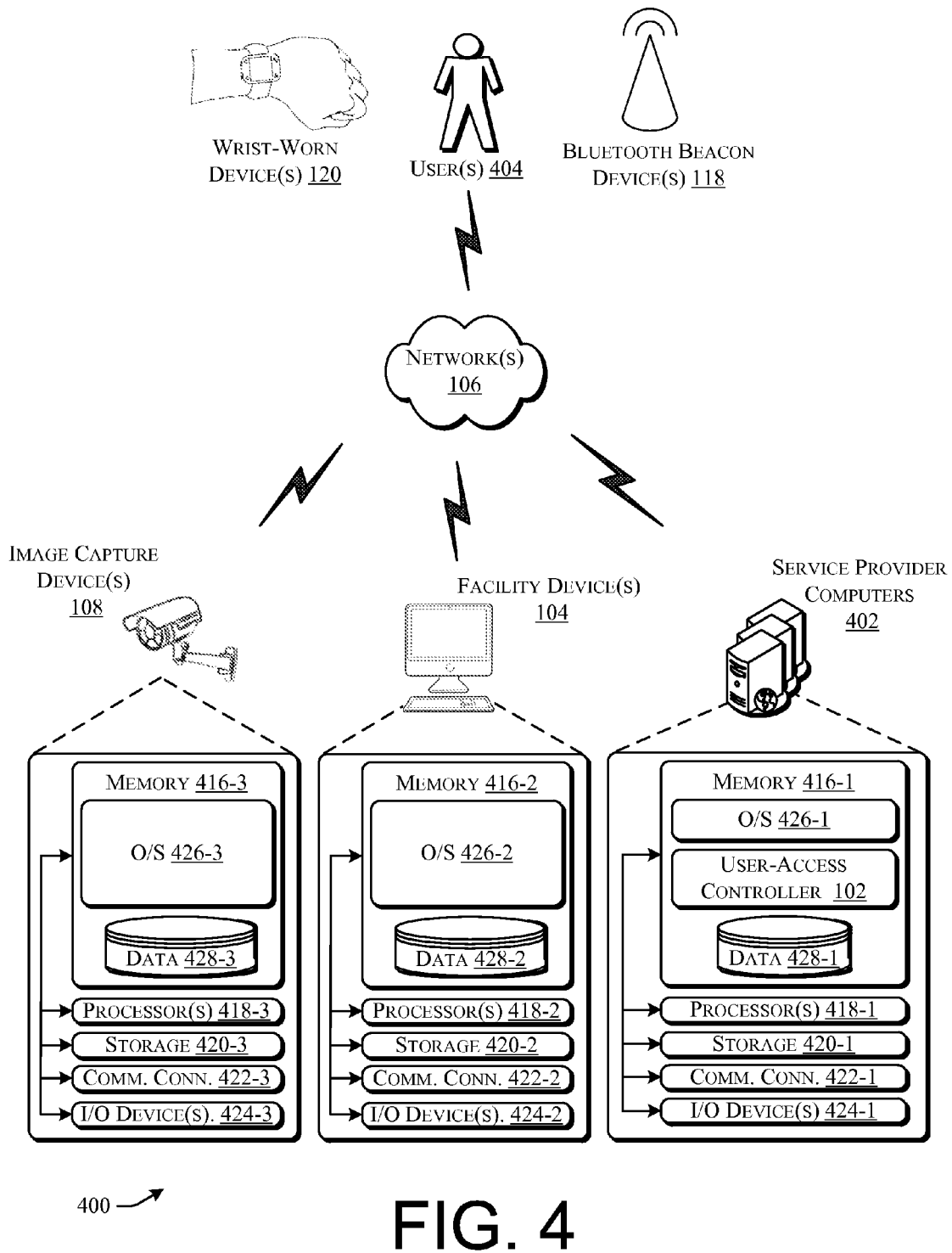
FIG. 4 depicts an example system or architecture for managing multi-user access for a facility, in accordance with at least one embodiment.

FIG. 4 depicts an example system or architecture 400 for managing user-access for a facility, in accordance with at least one embodiment. In this example, the user-access controller 102 is depicted as being located on service provider computer(s) 402. It should be understood that the user-access controller 102 may instead be located external to the service provider computer(s) 402. In architecture 400, a location of the user(s) 404 may be determined by the user-access controller 102, utilizing received information from the image capture device(s) 108, and/or the Bluetooth beacon device(s) 118, and/or the wrist-worn device(s) 120, each accessible by the user-access controller 102, via the network(s) 106. The user-access controller 102 may be hosted, managed, and/or provided by a computing resources service or service provider, such as by utilizing one or more service provider computer(s) 402. The service provider computer(s) 402, in some examples, provide computing resources such as, but not limited to, client entities, low latency data storage, durable data storage, data access, management, virtualization, cloud-based software solutions, electronic content performance management, etc.

In some examples, the wrist-worn device(s) 120 and/or the Bluetooth beaconing device(s) 118 communicate with the service provider computer(s) 402 via the network(s) 106, or via other wired/wireless network connections. Additionally, the wrist-worn device(s) 120 and/or the Bluetooth beaconing device(s) 118 may be part of a distributed system managed by, controlled by, or otherwise part of the service provider computer(s) 402.

In at least one embodiment, the user-access controller 102 allows the user(s) 404 to interact with the service provider computer(s) 402. The one or more service provider computer(s) 402, perhaps arranged in a cluster of servers or as a server farm, host the user-access controller 102 and/or cloud-based software services. Other server architectures may be used to host the user-access controller 102 and/or cloud-based software services. The user-access controller 102 is capable of handling requests from a user(s) 404 and serving, in response, various user interfaces that are rendered at the wrist-worn device(s) 120 and/or access interface(s) 114. The user-access controller 102 provides any type of device or application control. The user-access controller 102 and/or corresponding control are provided by the operating system 344 of the faceplate device 124.

In some aspects, the service provider computer(s) 402, the facility device(s) 104, and the image capture device(s) 108, are any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 402, the facility device(s) 104, and the image capture device(s) 108 are executed by one or more virtual machines implemented in a hosted computing environment. The hosted computing environment may include one or more rapidly provisioned and released computing resources, which computing resources may include computing, networking and/or storage devices. A hosted computing environment is also referred to as a cloud-computing environment.

In one illustrative configuration, the service provider computer(s) 402, the facility device(s) 104, and the image capture device(s) 108 each include at least one memory (e.g., memory 416-1, memory 416-2, and memory 416-3, respectively, hereinafter, the memory 416) and one or more processing units (e.g., processor(s) 418-1, processor(s) 418-2, and processor(s) 418-3, respectively, hereinafter, processor(s) 418). The processor(s) 418 are implemented as appropriate in hardware, computer-executable instructions, firmware, or combinations thereof. Computer-executable instruction or firmware implementations of the processor(s) 418 include computer-executable or machine-executable instructions written in any suitable programming language to perform the various functions described.

In at least one example embodiment, the memory 416 store program instructions that are loadable and executable on the processor(s) 418, respectively, as well as data generated during the execution of these programs. Depending on the configuration and type of service provider computer(s) 402, the facility device(s) 104, and/or the image capture device(s) 108, the memory 416 may be volatile (such as RAM) and/or non-volatile (such as ROM, flash memory, etc.). The service provider computer(s) 402, the facility device(s) 104, and/or the image capture device(s) 108 also include additional storage (e.g., additional storage 420-1, additional storage 420-2, and additional storage 420-3, respectively, hereinafter the additional storage 420) which includes removable storage and/or non-removable storage. The memory 416 and/or the additional storage 420, both removable and non-removable, are all examples of computer-readable storage media. In at least one example, computer-readable storage media include volatile or non-volatile, removable or non-removable media implemented in any method or technology for storage of information such as computer-readable instructions, data structures, program modules, or other data. Additional types of computer storage media that may be present in the service provider computer(s) 402, the facility device(s) 104, and/or the image capture device(s) 108 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 402, the facility device(s) 104, and/or the image capture device(s) 108, respectively. Combinations of any of the above should also be included within the scope of computer-readable media.

In accordance with at least one embodiment, the service provider computer(s) 402, the facility device(s) 104, and/or the image capture device(s) 108 contain communications connection(s) (e.g., communication connections 422-1, communication connections 422-2, and communication connections 422-3, respectively, hereinafter, communication connections 422) that allow the service provider computer(s) 402, the facility device(s) 104, and/or the image capture device(s) 108 to communicate with a stored database, another computing device or server, user terminals and/or other devices on the network(s) 106. The service provider computer(s) 402, the facility device(s) 104, and/or the image capture device(s) 108 also include I/O device(s) 424-1, I/O device(s) 424-2, and I/O device(s) 424-3, respectively (hereinafter I/O device(s) 424), such as a keyboard, a mouse, a pen, a voice input device, a touch input device, a display, speakers, a printer, etc.

Turning to the contents of the memory (e.g., the memory 416) in more detail, each memory includes an operating system (e.g., operating system 426-1, operating system 426-2, and operating system 426-3, respectively, hereinafter operating system 426), one or more data stores (e.g., data store(s) 428-1, data store(s) 428-2, and data store(s) 428-3, respectively, hereinafter data store(s) 428), and/or one or more application programs, modules, or services for implementing the features disclosed herein. For example, medical-related data, sensor and/or location data collected from wrist-worn device(s) 120, location data received by Bluetooth beacon device(s) 118, one or more images collected from image capture device(s) 108 and any suitable data utilized by user-access controller 102 may be stored in data store(s) 428, or a data store external to the service provider computer(s) 402, the facility device(s) 104, and/or the image capture device(s) 108.

Figure 5:
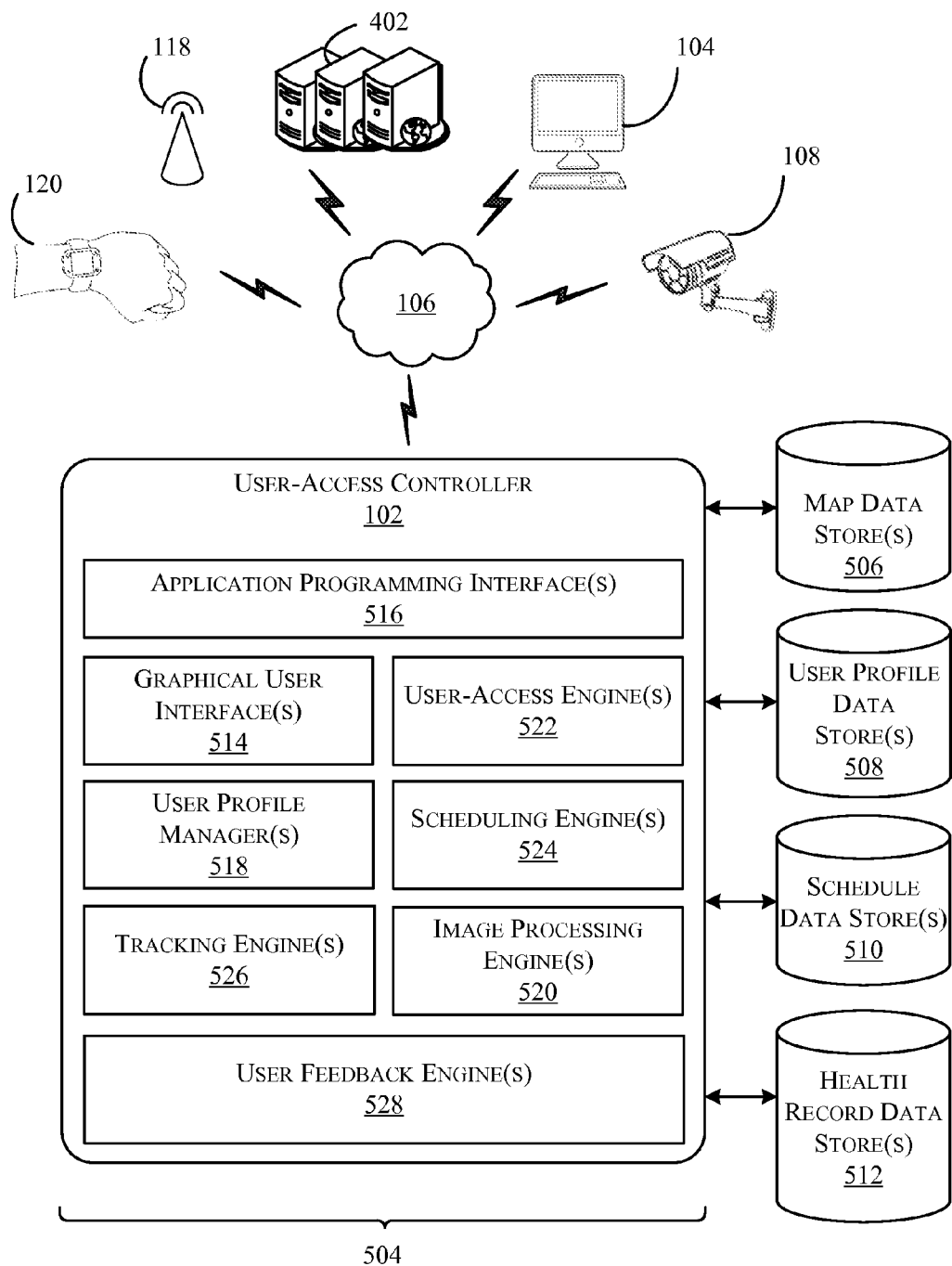
FIG. 5 depicts an example computer architecture 500 for providing a user-access controller, including a plurality of modules that may carry out various embodiments.

FIG. 5 depicts an example computer architecture 500 for providing a user-access controller 102, including a plurality of modules 504 that may carry out various embodiments. In at least some examples, the modules 504 are software modules, hardware modules, or a combination thereof. If the modules 504 are software modules, the modules 504 are embodied on a computer-readable medium and processed by a processor in any of the computer systems described herein. It should be appreciated that any module or data store described herein, may be, in some embodiments, a service responsible for managing data of the type required to make corresponding calculations. The modules 504 may be configured in the manner suggested in FIG. 5 or may exist as separate modules or services external to the user-access controller 102.

In the embodiment shown in the drawings, map data store(s) 506, user profile data store(s) 508, schedule data store(s) 510, and health record data store(s) 512 are shown, although data can be maintained, derived, or otherwise accessed from various data stores, either remotely or locally, to achieve the functions described herein. The user-access controller 102 includes various modules such as graphical user interface(s) 514, application programming interface(s) 516, user profile manager(s) 518, image-processing engine(s) 520, user-access engine(s) 522, scheduling engine(s) 524, tracking engine(s) 526, and the user feedback engine(s) 528. Some functions of the modules 514, 516, 518, 520, 522, 524, 526, and 528 are described below. However, for the benefit of the reader, a brief, non-limiting description of each of the modules is provided in the following paragraphs.

In accordance with at least one embodiment, a method is enabled managing multi-user access to a facility. For example, the user-access controller 102 may be a component of the service provider computer(s) 402 or reside on a computing device accessible to the service provider computer(s) 402 via the network(s) 106.

In accordance with at least one embodiment, access authority information may be entered (e.g., by an administrator/ employee of the facility using the facility device(s) 104) via the graphical user interface(s) 514, a component of the user-access controller 102. The facility device(s) 104 may be any electronic device capable of receiving and transmitting electronic data (e.g., a laptop, a cellphone, a tablet, etc.). Once configuration information is entered via the graphical user interface(s) 514, the application programming interface(s) 516, a component of the user-access controller 102, may be utilized to receive the access authority information. Any information discussed herein that is transmitted or received by the user-access controller 102 may utilize the application programming interface(s) 512.

In accordance with at least one embodiment, the user profile manager(s) 518, a component of the user-access controller 102, is configured to receive user-profile information. The user profile manager(s) 518 may be responsible for creating and maintaining a user profile utilized to store user-profile information, including, but not limited to, access authority information of the user. Further, the user profile manager(s) 518 may cause such information to be stored in the user profile data store(s) 508.

In accordance with at least one embodiment, the image processing engine(s) 520, a component of the user-access controller 102, is configured to receive one or more images from the image capture device(s) 108. For example, an image taken by the image capture device(s) 108 may include a group of people. Upon receipt, the image processing engine(s) 520 may determine a number of sub-images of the image utilizing machine image processing algorithms. The image processing engine(s) 520 may further be configured to communicate with the user profile manager(s) 518 in order to obtain user-profile information (e.g., a name of a user, an address of a user, a cell phone number of a user, an image of the user) and/or access authority information (e.g., a controlled area to which the user has access.). Upon determining the number of sub-images, the image processing engine(s) may identify a particular person in the sub-image by comparing/matching an image of the user to the sub-image. The image processing engine(s) 520 may calculate a confidence score for each image/sub-image that indicates, to some degree of confidence, that a particular person is included in the image/sub-image. Such confidence score(s) may be indicated by a percentage, a decimal number, an integer number, or any suitable means of indicating a score. In at least one example, the image processing engine(s) may communicate a match to the user-access engine(s) 522 for further processing. Additionally, or alternatively, the image processing engine(s) 520 may communicate the match to the tracking engine(s) 526 and/or the user profile manager(s) 518 for further processing.

In at least one embodiment, the user-access engine(s) 522, a component of the user-access controller 102, is configured to receive information from the image processing engine(s) 520. In at least one example, the user-access engine(s), a component of the user-access controller 102 is responsible for determining whether or not a user is allowed access to a controlled location of a facility. The user-access engine(s) 522 may be configured to communicate with the user profile manager(s) 518 in order to ascertain, receive, or otherwise obtain user profile information and/or access authority information for the user. The user-access engine(s) 522 may be configured to communicate with the scheduling engine(s) 524 in order to ascertain, receive, or otherwise obtain a schedule for a user and/or a schedule for the controlled location of the facility. The user-access engine(s) 522 may determine, using information obtained using the user profile manager(s) 518 and/or the scheduling engine(s) 524, and/or the image processing engine(s) 520 whether or not the user is allowed access to a particular controlled location. Upon such determination, the user-access engine(s) may cause a signal to be sent to the controlled location. Such a signal may result in various actions being performed (e.g., open/close/lock/unlock a door/window, enable elevator calling, triggering an alarm, etc.). Additionally, or alternatively, the user-access engine(s) 522 may communicate information to the user feedback engine(s) 528 to cause a notification, and/or a reminder, and/or an alert, and/or an alarm to be communicated to one or more of the facility device(s) 104, one or more of the wrist-worn device(s) 120, or any suitable device (e.g., a speaker located within the facility).

In at least one embodiment, the scheduling engine(s) 524, a component of the user-access controller 102, is configured to receive, or otherwise obtain, scheduling information for the user and/or a controlled location of a facility (e.g., from the schedule data store(s) 510). The scheduling engine(s) 524 may be responsible for determining a current time and comparing a current time to one or more schedule times. Based on such comparison, the scheduling engine(s) 524 may report, to any suitable component of the user-access controller 102, that a schedule (e.g., a schedule for the user and/or a schedule for the controlled location) permits or restricts the user from accessing the controlled location at the current time or for some period of time.

In at least one example, the scheduling engine(s) 524 may cause one or more reminders to be displayed/sounded on the wrist-worn device(s) 120 and/or the facility device(s) 104. For instance, scheduling engine(s) 524 may determine that a user (e.g., a resident, a patient, a prisoner, etc.) may have an appointment or scheduled time to access a controlled location. Upon such a determination, the scheduling engine(s) 524 may transmit information to the user feedback engine(s) 528 in order to cause information to be displayed on the wrist-worn device(s) 120, and/or the facility device(s) 104. In a non-limiting example, a nurse wearing a wrist-worn device may receive, via the wrist-worn device, a reminder that her patient has an appointment in a laboratory. Additionally, or alternatively, the reminder may be received and displayed on the facility device(s) 104. Additionally, or alternatively, the reminder may be delivered by an auditory device (e.g., a speaker).

In at least one embodiment, the tracking engine(s) 526, a component of the user-access controller 102, may be configured to track, or otherwise monitor, one or more persons in a facility. For example, the tracking engine(s) 526 may receive information from the image processing engine(s) 520 indicating that one or more people are included in an image at a specific controlled location. Additionally, or alternatively, the tracking engine(s) 526 may be configured to receive location information for a user from the wrist-worn device(s) 120 and/or the Bluetooth beaconing device(s) 118 and/or access interface(s) 114 (e.g., one or more RFID readers). In at least one example, the tracking engine(s) 526 may utilize the information from the image processing engine(s) 520, and/or the wrist-worn device(s) 120, and/or the Bluetooth beaconing device(s) 118, and/or the access interface(s) 114 to calculate a potential location for a specific person in the facility. In some cases, the tracking engine(s) 526 may communicate information regarding a potential location of the user to the user feedback engine(s) 528 for display on the facility device(s) 104 and/or the wrist-worn device(s) 120 and/or for auditory delivery using the facility device(s) 104, and/or the wrist-worn device(s) 120, and/or another suitable auditory device. In accordance with at least one embodiment, the tracking engine(s) 526 may cause such tracking data to be stored in, for example, the user profile data store(s) and/or the health record data store(s) 512.

In at least one embodiment, the user feedback engine(s) 528, a component of user-access controller 102, may be configured to interact with map data store(s) 506 in order to display a map of a geographical location (e.g., a hospital ward floor plan, assisted living home floor plan, a prison wing, etc.). In at least one example, the user feedback engine(s) 528 may cause a floor plan of a hospital ward to be displayed, for example, on the facility device(s) 104), with, in some cases, at least one graphical element superimposed over the floor plan indicating a location of a user. In accordance with at least one embodiment, the user feedback engine(s) 528 may be configured to cause a notification, a reminder, an alert, and/or an alarm to be communicated to one or more of the facility device(s) 104, one or more of the wrist-worn device(s) 120, or any suitable device. Such a notification, reminder, alert, and/or alarm may be visual and/or audible in nature. If visual, the notification, alert, and/or alarm may include a flashing light, and/or an email message, and/or SMS texting, or the like. If audible, the notification, alert, and/or alarm may include, for example, a spoken word sounded on a speaker system, a tone/series of tones sounded on a speaker system, or the like.

Figure 6:
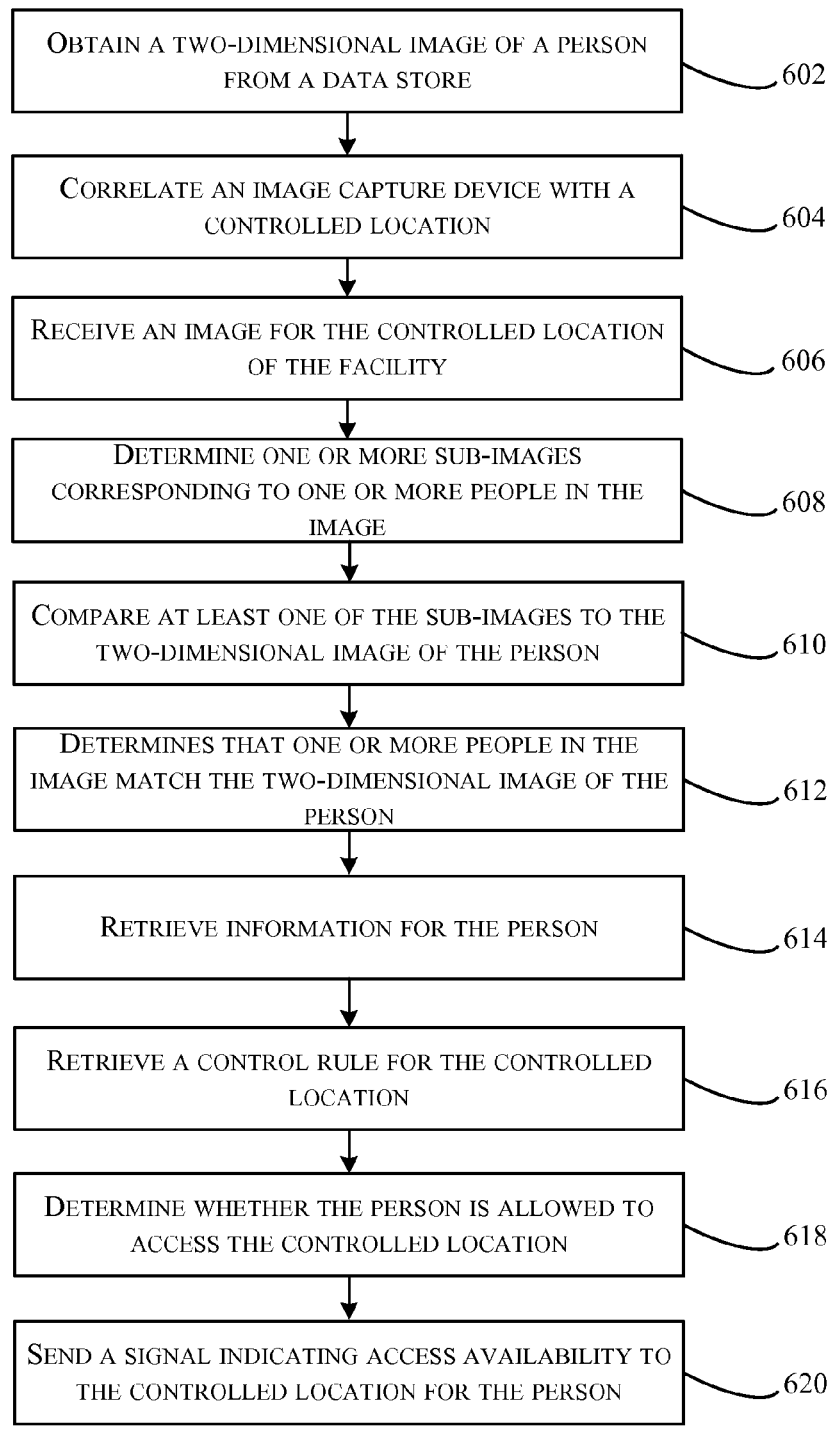
FIG. 6 depicts a flow chart of an example method for using the user-access controller, in accordance with at least one embodiment.

FIG. 6 depicts a flow chart 600 of an example method for using the user-access controller 102, in accordance with at least one embodiment. The flow chart 600 begins at block 602, where a two-dimensional image of a person is obtained from a data store. For example, the two-dimensional image of the person may be captured by an image capture device of the facility (e.g., the image capture device(s) 108 and/or an image capture device in communication with the facility device(s) 104). As a non-limiting example, a person (e.g., as a patient, as a prisoner, as a visitor, as an employee, etc.) may undergo a registration process upon entering the facility for a first time, or at any suitable time. The registration process may include capturing a digital image of the person to be used as a baseline image for the user for future image processing. Additionally, user profile information including, but not limited to, a name, an address, a contact phone number, emergency contact information, or the like may be collected during the registration process or at any suitable time. Such user-profile information may be communicated to the user-access controller 102 (e.g., using the graphical user interface(s) 514, and/or the application programming interface(s) 516, and/or the user profile manager(s) 518). Such user profile information may be stored, for instance, in the user profile data store(s) 508.

At block 604, an image capture device is correlated with a controlled location. For example, the user-access controller 102 may determine, from a mapping or similar mechanism, that a particular image capture device of the facility is correlated to a particular controller location of the facility. In at least one example, such information may be stored in the map data store(s) 506, separately or together with electronic map information of the facility (e.g., floor plan data, schematic(s), etc.).

At block 606, an image may be received from an image capture device, the image being for the controlled location of the facility, the image recording one or more people. In at least one example, one or more people walking up to a door of the facility at which a image capture device is posted may be recorded in an image taken by the image capture device posted at, for example, the door. Similarly, an image capture device posted to obtain a view of a hallway, room, door, window, or other controlled area, may capture one or more people within the controlled location. For example, individual images may capture a nurse sitting at his desk, a doctor travelling down a hallway, a prisoner in her cell, or the like. It should be understood that the image capture device does not necessarily have to be affixed, nor does the image capture device need to be affixed and/or located within a particular distance of the controlled location.

At block 608, one or more sub-images corresponding to the one or more people in the image may be determined. For example, the image processing engine(s) 520 may analyze the images using one or more machine image processing algorithms to determine the one or more sub-image. As used herein, a "sub-image" is intended to refer to a portion of the image received. In some example, the sub-image may contain a person's face, a badge, an embroidered name on a uniform garment, a retina, or the like.

At block 610, at least one or more of the sub-images are compared to the two-dimensional image of the person. In at least one example, the sub-image determined by the image processing engine(s) 520 includes a person's face.

At block 612, it may be determined, using a machine image processing algorithm, that the one or more people match the two-dimensional image of the person. For example, the image processing engine(s) 520 may utilize one or more machine image processing algorithms to compare the sub-image (e.g., the person's face) to the two-dimensional image of the person (e.g., a profile image of a user's face obtained at, for example, registration).

At block 614, information may be retrieved for the person. For example, information may be retrieved for the person in response to determining that the two-dimensional image of the person matches the sub-image. Such information may include user-profile information and/or access authority information.

At block 616, a control rule for the controlled location may be retrieved. "A control rule," is intended to refer to logic associated with controlled location that allows/restricts users with respect to the controlled location. A control rule may be indicated using a schedule associated with the controlled location (e.g., using scheduled times during which the controlled location is accessible or restricted). In accordance with at least one embodiment, one or more control rules may be retrieved from, for example, the map data store(s) 506 and/0 the schedule data store(s) 510.

At block 618, a determination may be made (e.g., by the user-access engine(s) 522) as to whether the person is allowed to access the controlled location, wherein the determining is a function of the information and the control rule. For example, a schedule for the controlled location may indicate that users, other than janitorial staff, are restricted from accessing the controlled location from the hours of 12:00 AM to 6:00 AM daily. Additionally, or alternatively, a control rule for the controlled location may indicate that only users associated with a certain user role may be permitted access. Generally speaking, control rules may be associated and/or stored with floor plan(s), schematic(s), facility schedule(s), or the like. Control rules may relate to a facility as a whole, and/or a portion of the facility. For example, a pharmacy may have a controlled location that houses particular drugs that are exceptionally dangerous and/or prone to theft. Thus, a control rule for the controlled location may specify that users having a role of "pharmacists" are allowed to access the controlled location while users having a rule of "cashier" are not. Similarly, in an assisted living facility, a control rule for a portion of the facility may specify that users having a user role of "staff" or "doctor" may be allowed access to the controlled location, while users having a user rule of "patient" or "resident" may be restricted from accessing the controlled location.

At block 620 a signal may be sent indicating access availability to the controlled location for the person based on the determination at block 618. The signal may cause a door/window to open/close/lock/unlock, enable elevator calling, cause a notification/reminder/alert/alarm to be triggered, or the like. The signal may be send by the user-access engine(s) 522, and/or user feedback engine(s) 528, or another suitable component of the user-access controller 102.

Figure 7:
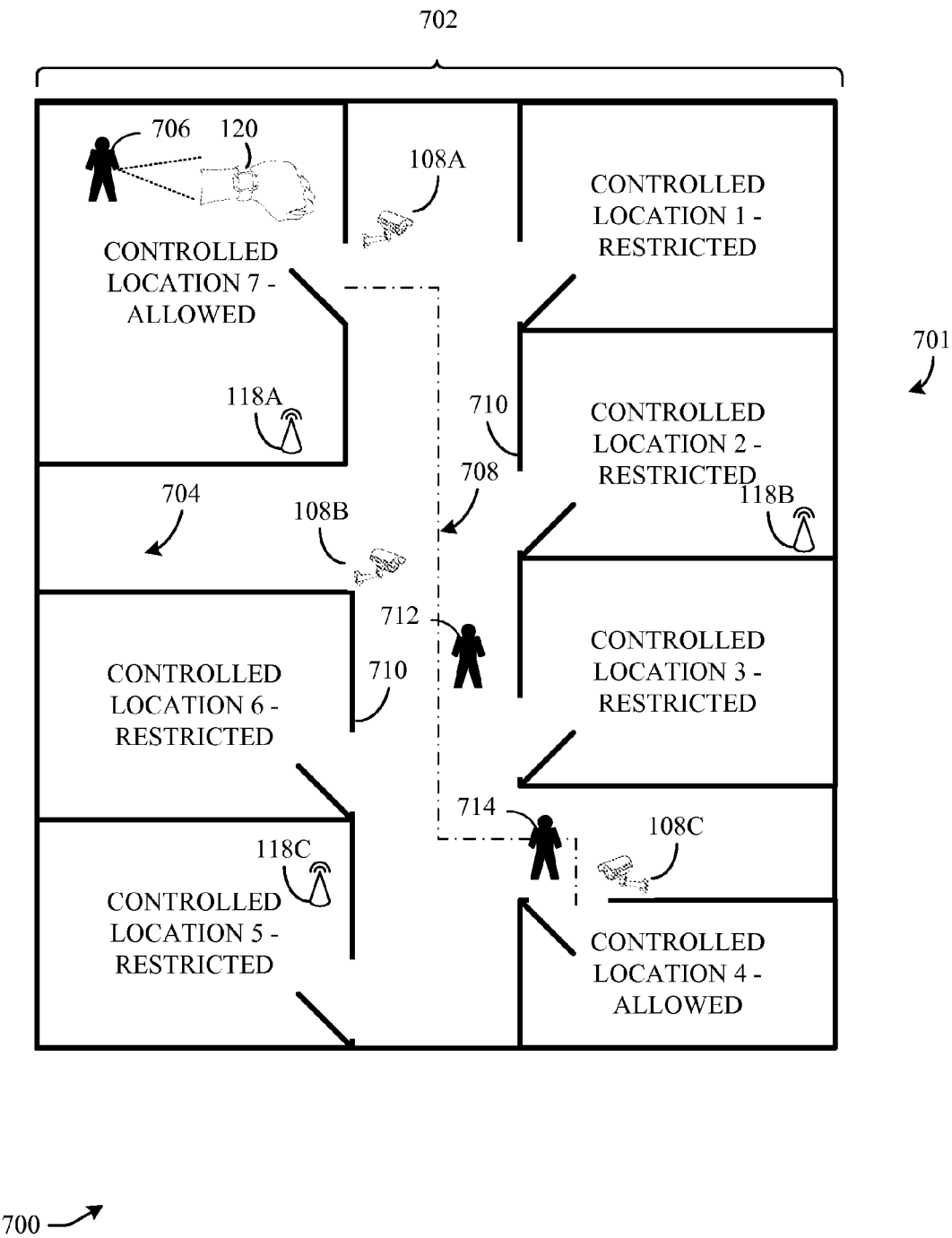
FIG. 7 depicts a schematic illustrating an example method for managing multi-user access for a facility using the user-access engine 102, in accordance with at least one embodiment.

FIG. 7 depicts a schematic 700 illustrating an example method for managing multi-user access for a facility (e.g., facility 701) using the user-access controller 102, in accordance with at least one embodiment. It should be understood that any described functionality performed utilizing Bluetooth beaconing device(s) 118, wrist-worn device(s) 120, and RFID readers 710 may be omitted in one or more embodiments. In accordance with at least one embodiment, a facility floor plan 702 may be displayed to a user (e.g., using facility device(s) 104). The facility floor plan 702 may include on or more rooms, hallways, common areas, spaces, cells, or the like. For example, in the schematic 700, controlled locations 1-7, as is hallway 704, are intended to depict controlled locations. In at least one example, user-access controller 102 may retrieve the facility floor plan 702 from an electronic data storage location (e.g., the map data store(s) 506) and cause the facility floor plan 702 to be displayed on an electronic device (e.g., the facility device(s) 104).

In accordance with at least one embodiment, user 706 may optionally be wearing, or otherwise carrying the wrist-worn device(s) 120 and/or a cellphone or other electronic device capable of communicating with a the Bluetooth beaconing device(s) 118A-118C (collectively, Bluetooth beaconing device(s) 118). Bluetooth beaconing device(s) 118 may be configured as shown in FIG. 7 or may be configured in any suitable configuration as would be obvious to one skilled in the art of configuring Bluetooth beaconing device within the facility 701. A single Bluetooth beaconing device may reside in each room, in a subset of the rooms, or otherwise spread out in the facility 701. At least one Bluetooth beaconing device may reside outside the facility. In at least one example, user-access controller 102 may retrieve the facility floor plan 702 from an electronic data storage location (e.g., map data store(s) 506). Bluetooth beaconing device 118A may be correlated to the controlled location 7 or an area occurring within a threshold distance of the location of Bluetooth beaconing device 118A. Bluetooth beaconing device 118B may be correlated to the controlled location 2 or an area occurring within a threshold distance of the location of Bluetooth beaconing device 118B. Bluetooth beaconing device 118C may be correlated to the controlled location 5 or an area occurring within a threshold distance of the location of Bluetooth beaconing device 118C.

In accordance with at least one embodiment, the image capture device(s) 108A-108C (collectively, the image capture device(s) 108) may be configured as shown in FIG. 7 or may be configured in any suitable configuration as would be obvious to one skilled in the art of configuring image capture devices within the facility 701. A single image capture device, or multiple image capture devices, may reside in each room, in a subset of the rooms, in a space, in a hallway, or otherwise suitably spread out in the facility 701. At least one image capture device may reside outside the facility. Image capture device(s) 108 may provide continuous view-ability of the facility or may instead provide intermittent view-ability (e.g., not every portion of the facility is viewable by an image capture device). Each image capture device may be correlated with a controlled location of the facility. For example, the image capture device(s) 108 may each be associated with hallway 704. Additionally, or alternatively, image capture device 108A may be correlated with the controlled location 7 and/or controlled location 1, and/or the controlled location 2. Image capture device 108B may be correlated with controlled location 3 and/or controlled location 4, and/or controlled location 6. Image capture device 108C may be correlated with controlled location 4 and/or controlled location 5.

In accordance with at least one embodiment, each controlled location (e.g., each room depicted in FIG. 7 and the hallway 704) may be monitored using the image capture device(s) 108, and/or the Bluetooth beaconing device(s) 118, and/or the wrist-worn device(s) 120 worn by any combination of users within and/or near the facility 701 (including no users), or any suitable combination of the above.

In accordance with at least one embodiment, each controlled location in the facility 701 may be accessible/restricted to the user 706. For example, the user 706 (e.g., a patient) in an assisted living facility may be allowed access to the controlled location 7 as the controlled location 7 is where the user 706 resides. The user 706 may further be allowed access to hallway 704 due to the requirement that the user 706 pass through hallway 704 in order to access other controlled locations. In this example, the user 706 may further be allowed access to the controlled location 4 (e.g., the facilities cafeteria) as controlled location 4 is where the user received his meals. Path 708 may be additionally be included as a controlled location. The path 708 may be accessible to the user 706 as a pattern of traversal the user may execute when going to get food from the controlled location 4. In at least some examples, the user 706 may be restricted from deviating from the path 708. Deviation may be ascertained using the image capture device(s) 108, and/or the Bluetooth beaconing device(s) 118, and/or the wrist-worn device(s) 120, and/or the RFID readers 710, or any suitable combination of the above (e.g., using only the image capture device(s) 108). In a non-limiting example, the user 706 may be a visitor to the facility. In such an example, the user 706 may check-in to the facility at the controlled location 7. The user 706 may then be restricted to travelling only the path 708 to visit, for example, his grandmother in the controlled location 4. In some cases, if the user 706 deviates from the path 708 (e.g., as determined utilizing images captured by the image capture device(s) 108, for example), a notification/reminder/alert/alarm will be triggered (e.g., on the facility device(s) 104, on a speaker located within the facility 701).

In accordance with at least one embodiment, the user 706 may be carrying an RFID tag (e.g., as part of an employee badge, as part of the wrist-worn device(s) 120, etc.). RFID readers 710 may be located at each door, or subset of doors corresponding to controlled locations 1-7 depicted in FIG. 7. The user 706 may utilize an RFID tag at one or more of the RFID readers 710 of the facility 701. Such information may be communicated to the user-access controller 102 where the user-access controller 102 may attempt to authenticate the user's information and allow/restrict access accordingly. Additionally, or alternatively, RFID information may be utilized and/or stored to be used in calculations involving tracking and/or otherwise determining a user's location within the facility 701.

In accordance with at least one embodiment, over a period of time, the image capture device(s) 108, and/or the Bluetooth beaconing device(s) 118, and/or the RFID readers 710, and/or the wrist-worn device(s) 120, or any suitable combination of the above, may communicate information to the user-access controller 102. Upon receipt, the user-access controller 102 may utilize the received information to track the user 706 through the facility 701, obtain location information of the user 706, or the like.

In a non-limiting example, the user 706 may enter the facility 701 by entering the controlled location 7. The user 706 may be carrying a cell-phone. Consider the case where user 706 is at the facility 701 to visit his grandmother. The user 706 may be met with a staff person associated with the facility 701 in the controlled location 7. The staff person may collect the user's profile information (e.g., name, address, phone number, driver's license number or other identification number, associated persons in the facility, etc.). Such user profile information may be entered using, for example, the facility device(s) 104. The facility device(s) 104 may communicate such information to the user-access controller 102. The user profile manager(s) 518, or some suitable component of the user-access controller 102, may cause such user profile information to be stored in, for example, the user profile data store(s) 508. The user may, as part of the same process, be associated with access authority information. For example, the user 706 may be manually allowed to access one or more controlled locations. The user 706 may manually be allowed to access the controlled location 7, and/or the hallway 704 and/or the controlled location 4 of FIG. 7. Such access authority information may be manually entered, may be generated from a path defined by the staff person on the facility device(s) 104 (e.g., by tracing a path through the facility 701 using an electronic representation of the facility floor plan 702), may be allowed by default, may be determined by the user-access controller 102 as a function of the user's starting location and the location of any person in the facility, may be determined by the user-access controller 102 as a function of the one or more controlled locations to which the user has access, or any suitable combination of the above.

In one non-limiting example, upon entry of the user's profile information and/or access authority information, the user 706 may begin to be monitored/tracked as he transitions from one location to the next within the facility 701. For example, while the user 706 is located in the controlled location 7, the Bluetooth beaconing device 118A may determine the location of the user 706 using the cell phone and/or the wrist-worn device(s) 120. As the user 706 travels into the hallway 704 along the path 708, the image capture device 108A may capture one or more images of the user 706 as he travels along the path 708. Additionally, or alternatively, the Bluetooth beaconing device(s) 118 may obtain location information of the user 706 as the user 706 travels along the path 708. After the user 706 passes image capture device 108B at location 712, the image capture device 108B may capture one or more images of the user 706. Bluetooth beaconing device(s) 118 may obtain further location information of the user 706 at the location 712, or at any suitable point along the path 708, or for any suitable user-location within a threshold distance of the Bluetooth beaconing device(s) 118. As the user 706 approaches the controlled location 4, the image capture device 108C may capture one or more images of the user 706 at the location 714 or at any suitable point along the path 708, or at any suitable location viewable to the image capture device 108C. Any image captured by image capture device(s) 108, and/or any location information received/determined by the Bluetooth beaconing device(s) 118, and/or wrist-worn device(s) 120, and/or RFID readers 710 may be communicated to user-access controller 102.

In one non-limiting example, the user 706 may be travelling toward a particular heading (e.g., towards the controlled location 4). In such cases, user-access controller 102, may receive one or more inputs (e.g., image(s) from image capture device(s) 108, and/or location data from the Bluetooth beaconing device(s) 118, and/or RFID data from the RFID readers 710, and/or location data from the wrist-worn device(s) 120, or any suitable combination of the above). Upon receipt, a component of user-access controller 102 (e.g., the tracking engine(s) 526) may calculate a potential future user location according to the received one or more inputs. As a non-limiting example, the tracking engine(s) 526 may receive one or more images from image capture device 108A indicating that the user 706 is traveling down the hallway 704. Upon receipt, the tracking engine(s) 526 may determine that the user is heading away from the image capture device 108A. Additionally, the tracking engine(s) 526 may determine a speed at which the user 706 is moving by comparing a size of the user in a first image and a size of the user in a second image. Additionally, or alternatively, the tracking engine(s) may calculate a potential destination including a potential time of arrival as a function of user-profile information indicating person(s) associated with the user 706 (e.g., the grandmother). Perhaps, in this example, the image capture device 108B is malfunctioning and does not capture an image of the user 706. In this case, the tracking engine(s) 526, upon calculating a potential destination by determining where the grandmother is located (e.g., the controlled location 4) and/or using the heading of the user 706 as indicated by the one or more received inputs, may further determine a potential arrival time using, for example, the calculated user speed determined from the one or more inputs. Alternatively, the user may be allotted by the tracking engine(s) 526 a predefined amount of time to arrive at the destination. In at least some example, if the user 706 does not arrive at the predetermined/calculated arrival time a notification/reminder/alert/alarm may be triggered by the tracking engine(s) 526 or any suitable component of the user-access controller 102.

Figure 8:
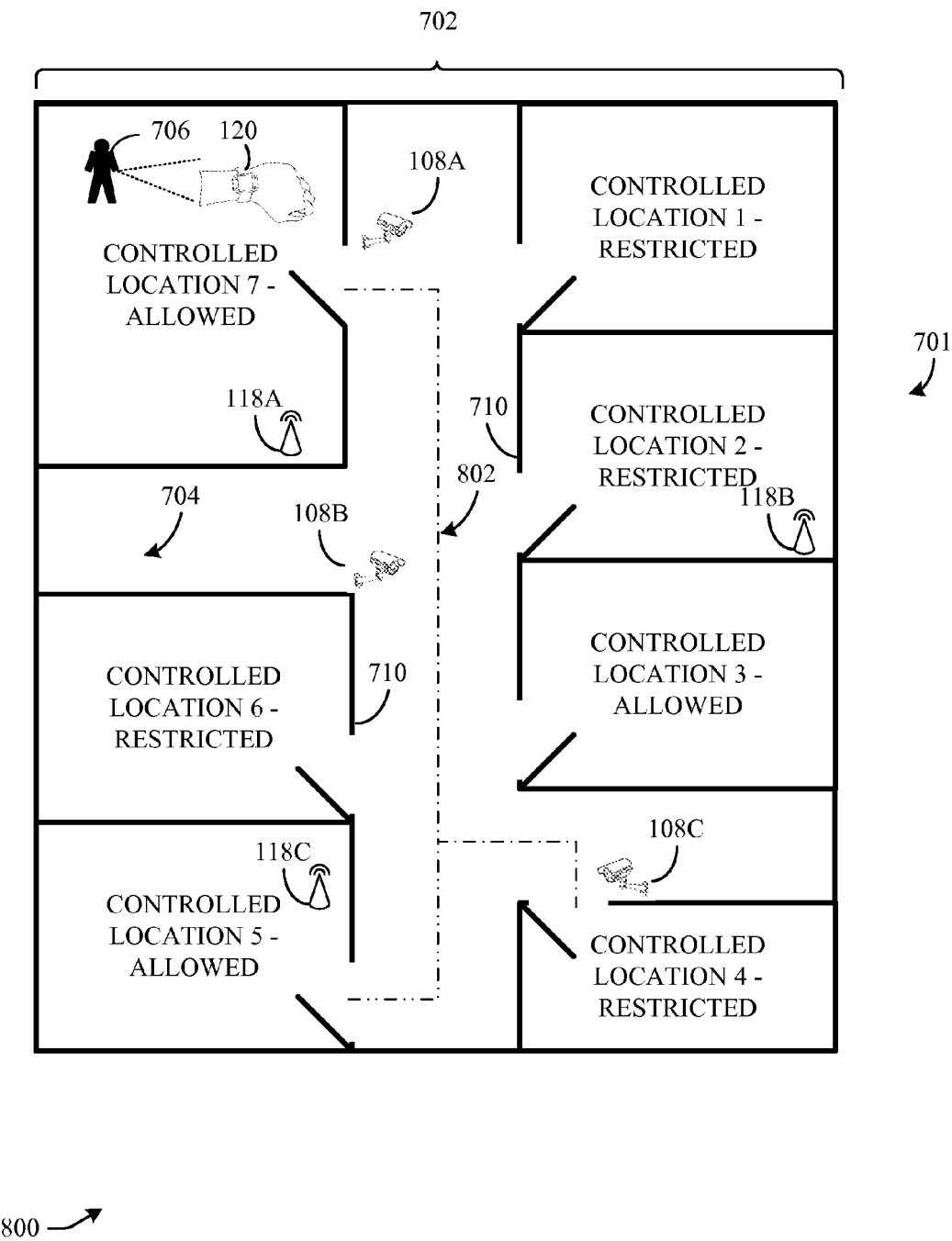
FIG. 8 depicts a schematic illustrating another example method for managing multi-user access for a facility using the user-access controller, in accordance with at least one embodiment.

FIG. 8 depicts a schematic 800 illustrating another example method for managing multi-user access for a facility (e.g., the facility 701 of FIG. 7) using the user-access controller (e.g., the user-access controller 102), in accordance with at least one further embodiment. Continuing on with the example facility 701 illustrated in FIG. 7, a schedule for the user 806 (e.g., a patient) and/or a schedule for a controlled location may be determined by a component of the user-access controller 102 (e.g., scheduling engine(s) 524). For example, consider that the controlled location 7 is the user's residence, the controlled location 4 is a cafeteria, and controlled location 5 is a laundromat. At a first time period, the user 806 may be allowed/restricted to controlled locations 1-7 as depicted in FIG. 7. At another time period (e.g., an hour after the first time period), the user 706 may be allowed/restricted to controlled locations 1-7 as depicted in FIG. 8. For example, a schedule for the user 706 may specify that the user 806 should be allowed in his room (e.g., the controlled location 7) at any time. However, the schedule for the user 806 may further specify that the user 806 be allowed access to the controlled location 4 during meal times (e.g., between the hours of 8 AM and 9 AM, 12 PM and 2 PM and 5 PM and 7 PM, respectively). Additionally, for this example, the schedule for the user 806 may specify that the user 806 may have access to controlled location 5 (e.g., the laundromat) only from the hours of 7 PM and 8 PM.

In at least one example, the user 806, having been first allowed to access the controlled location 4 may be given a period of time (e.g., 2 minutes) within which to exit the controlled location 4 after a time at which the controlled location 4 becomes restricted to the user 806. If the user 806 does not leave within the period of time, a notification/reminder/alert/alarm may be triggered in a similar manner as described above.

In accordance with at least one embodiment, the activities of the user 806 may be tracked and stored by a component of the user-access controller 102 (e.g., the tracking engine(s) 526). In at least one example, the user 806 may have been instructed by a physician to walk about the facility 701. Additionally, or alternatively, the user's tracked information may be useful in determining whether the user 806 has been going to meals, participating in activities offered throughout the facility 701, and/or utilizing various resource of the facility 701, or the like. The tracked information may, in some cases, be stored in the health record data store(s) 512, along with, or associated with, medical-related information of the user 806. Additionally, or alternatively, such tracked information may, in some cases, be stored along with user profile information in user profile data store(s) 508. Such information may be accessible by, for example, a doctor, at a suitable time during which the doctor may ascertain the activities and/or behaviors of the user 806.

In accordance with at least one embodiment, one or more controlled locations associated with the facility 701 (e.g., internal or external controlled locations of the facility 701) may be associated with one or more corresponding control rules. For example, the controlled location 4 (e.g., a cafeteria) may have hours of operation during which any users may be allowed access. Additionally, or alternatively, a controlled location may be associated with one or more user roles such that only users of the one or more associated user roles may be allowed access to the controlled location. For example, controlled location 3 of FIG. 8 may be a laboratory. User 706 (e.g., a patient) may be associated with a user role that is not allowed access to controlled location 3. Alternatively, user 706 may be associated with a user role (e.g., "lab assistant") that is allowed access to controlled location 3 according to one or more control rules for controlled location 3 (a controlled location).

Figure 9:
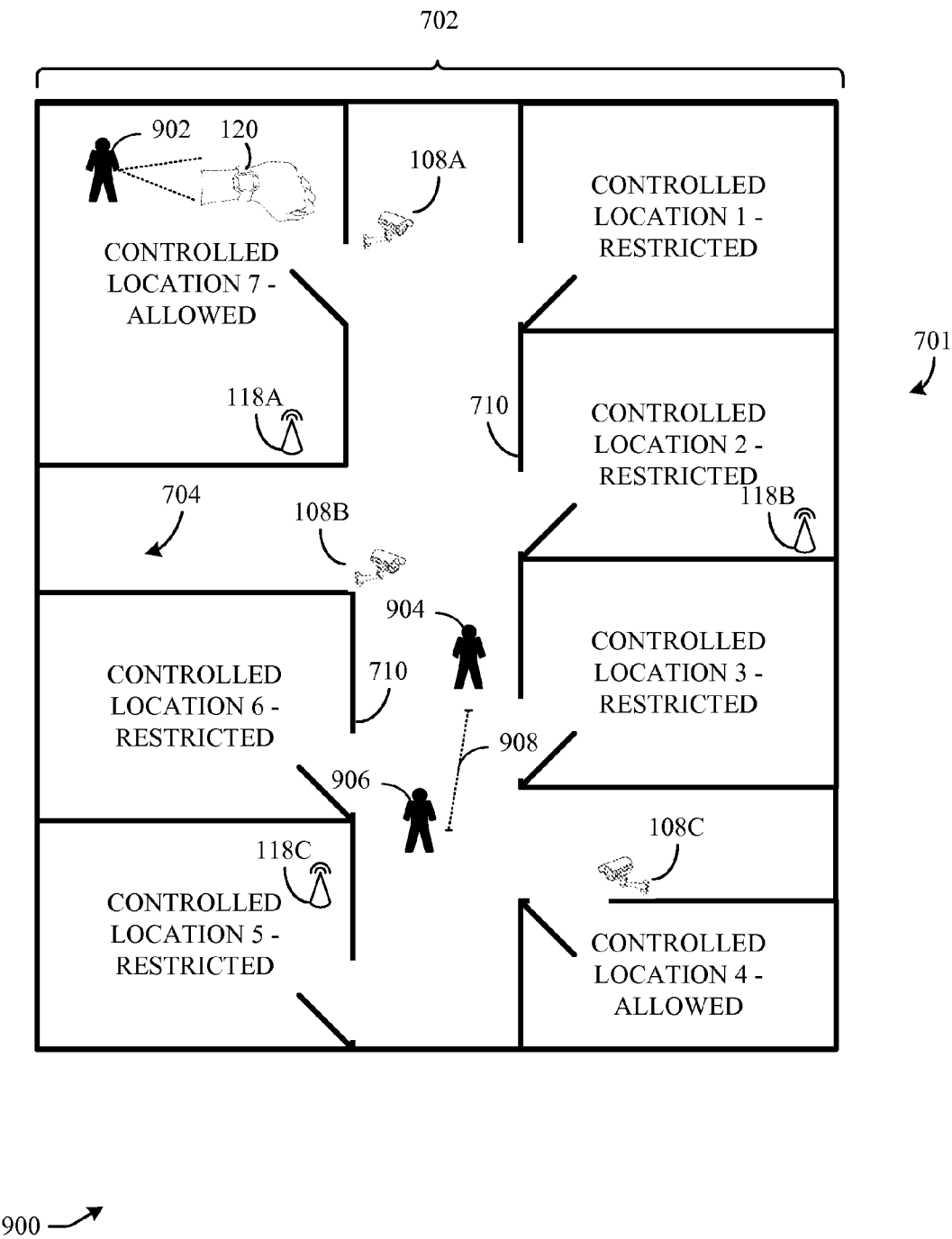
FIG. 9 depicts a schematic illustrating yet another example method for managing multi-user access for a facility using the user-access controller, in accordance with still one further embodiment.

FIG. 9 depicts a schematic 900 illustrating yet another example method for managing multi-user access for a facility (e.g., the facility 701 of FIG. 7) using the user-access controller (e.g., user-access controller 102), in accordance with still one further embodiment. Continuing on with the example facility 701 of FIG. 7, one or more users (e.g., user 902, user 904, and/or user 906) may be tracked throughout the facility 701 in a similar manner as described above. In at least one example, access authority information for user 904 may indicate that he is not to be within distance 908 of the user 906. For example, perhaps the user 904 and the user 906 are prisoners in a federal prison that have had previous physically violent altercations with one another. Such altercations may have resulted in an administrator of the facility 701 including access authority information of a user (e.g., user 906) indicating that the user 906 is not to come in contact with the user 904, and vice versa. In some cases, the user-access controller 102 (e.g., the tracking engine(s) 526 and/or the user-access engine(s) 522) may enforce such restrictions. For example, access authority information may specify a distance 908 for which the user 904 is to maintain from the user 906, at all times, or during at least some specified time period. For example, distance 908 may be a distance measurement (e.g., 20 feet, 3 meters, etc.). Alternatively, access authority information for the user 904 may specify that the user 904 may not occupy the same room as the user 906, at any time, or during at least some specified time period. In at least one example, if the tracking engine(s) 526 determines that the user 904 has violated either access authority rule (e.g., by coming within a distance of the user 906 that is less than distance 908 and/or by occupying the same room as the user 906 over a threshold amount of time) then a notification/reminder/alert/alarm may be triggered in a similar manner as described in the above examples.

Figure 10:
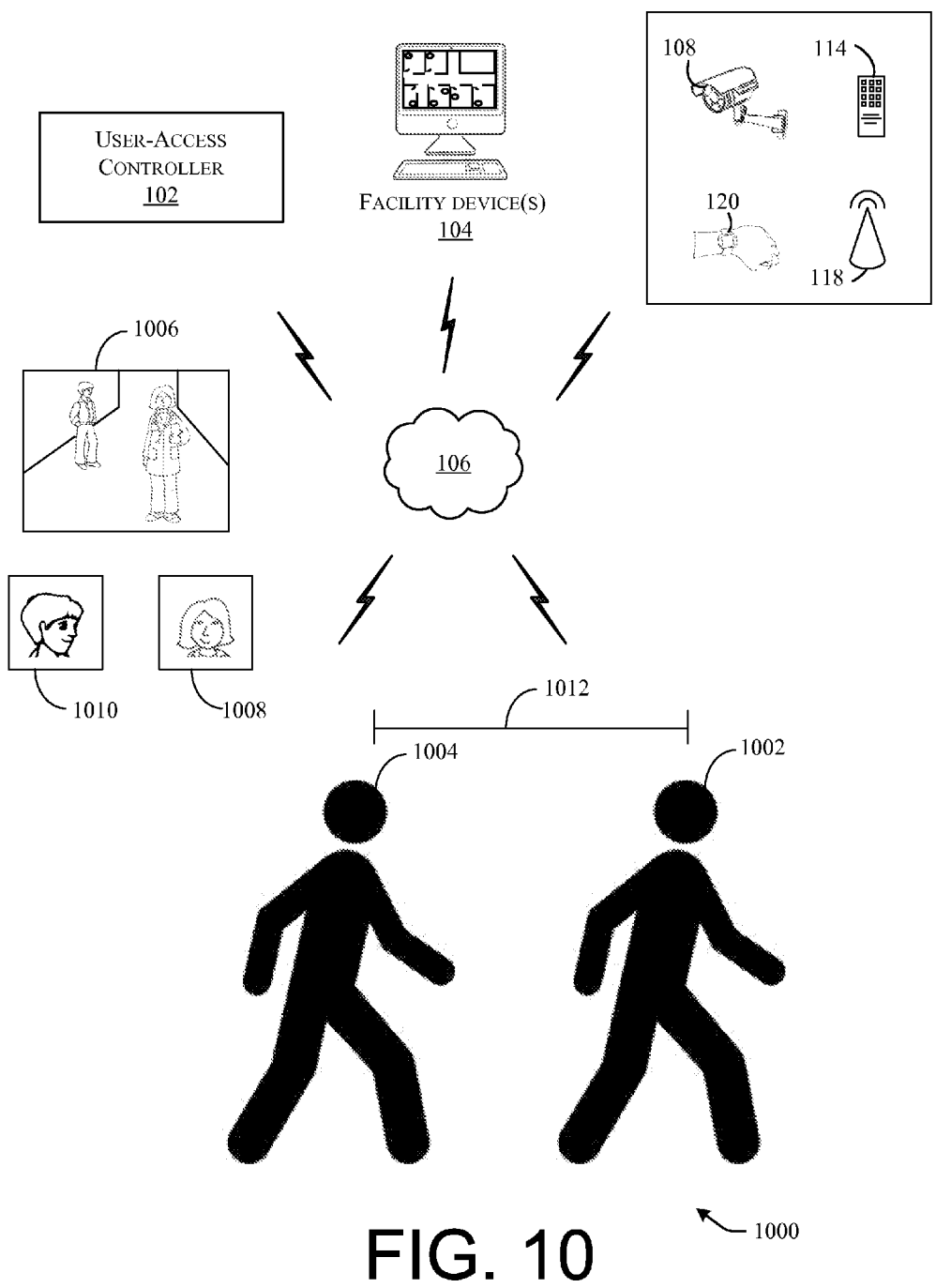
FIG. 10 depicts another example environment of an embodiment of a multi-user access system for managing user access for a facility using the user-access controller, in accordance with at least one embodiment.

FIG. 10 depicts another example environment 1000 of an embodiment of a multi-user access system for managing user access for a facility using the user-access controller, in accordance with at least one embodiment. In accordance with at least one embodiment, one user's access authority information may be used to override accessibility of another user to a controlled location. For example, a doctor 1002 and a patient 1004 may approach a controlled location (e.g., a door of facility 701). As the doctor 1002 and the patient 1004 approach the controlled location, an image 1006 may be captured by, for example, the image capture device(s) 108. The image capture device(s) 108 may communicate the image 1006 to the user-access controller 102 via the network(s) 106. In one non-limiting example, information regarding the location of the doctor 1002 and/or the patient 1004 may additionally, or alternatively, be collected by the wrist-worn device(s) 120, and/or the Bluetooth beaconing device(s) 118, and/or the access interface(s) 114 (e.g., an RFID reader), though such devices are not required for every embodiment. Location information may also be communicated to the user-access controller 102 via network(s) 106.

In accordance with at least one embodiment, the image capture device(s) 108, and/or the access interface(s) 114, and/or the wrist-worn device(s) 120, and/or the Bluetooth beaconing device(s) 118 associated with the facility 701 may be utilized to determine that one or more people are approaching a controlled location (e.g., a controlled location correlated with a particular image capture device). In at least one example, a visual and/or audible (e.g., verbal and/or non-verbal) attention-drawing measure (e.g., a blinking light, an audible tone, a verbal command) may be utilized to prompt and/or direct the one or more people gaze in a particular direction (e.g., in the direction of the particular image capture device) in order to minimize and/or eliminate the need for the one or more people to stop outside the controlled location (e.g., to wait for image processing to complete before access is granted).

In accordance with at least one embodiment, upon receipt of an image 1006 from the image capture device(s) 108, one or more sub-images of the image 1006 may be determined. For example, a component of the user-access controller 102 (e.g., the image processing engine(s) 520) may, determine the sub-image 1008 and the sub-image 1010 utilizing one or more machine image processing algorithms. For example one such machine image processing algorithm that may be utilized to search for and isolate portions of the image 1006 that appear to be a person's face. In one non-limiting example, a facial recognition algorithm may be used to determine the sub-image 1008 (e.g., an image of the doctor's face) and the sub-image 1010 (e.g., an image of the patient's face). The sub-images may be used in a comparison between the sub-images and stored images of the doctor 1002 and the patient 1004. Through such comparison, the identity of the doctor 1002 and the patient 1004 may be determined. For example the sub-image 1008 may be compared to one or more stored images until a matching stored image is found. Upon determining that the sub-image 1008 matches a stored image, the user's identify may be ascertained by, for example, accessing the user-profile information associated with the stored image. Access authority information for the user (e.g., the access authority information of the doctor 1002) may be ascertained by accessing the access authority information associated with the stored image (e.g., via a user profile stored in the user profile data store(s) 508). User profile information and access authority information for patient 1004 may be ascertained in a similar manner utilizing sub-image 1010 and one or more stored images.

In at least one example, images of a user who is not associated with a stored image may be analyzed. For example, an image may be analyzed to determine that a user is not associated with a stored image. In some cases, the user who is not associated with a stored images may be allowed access to some or all of the controlled locations of the facility by default. In another example, a child may break away from her parent and approach a controlled location. Upon receiving the image of the child, machine image processing algorithm(s) may be utilized to estimate an approximate age (e.g., 4 years old in this case). Upon determining that the child in the image is likely (e.g., within some degree of likelihood) a person under a threshold age (e.g., 10 years old), access may be restricted such that the child may not access the controlled location.

In accordance with at least one embodiment, once each of the doctor 1002 and the patient 1004 are identified and access authority information for each user obtained, a component of the user-access controller 102 (e.g., the user-access engine(s) 522), may determine whether to allow both users, one user, or neither user to access the controlled location. In at least one example, the controlled location has a control rule that specifies that users having a user role of "doctor" may access the controlled location (e.g., an examination room) at any time. Additionally, the controlled location may have a further control rule that specifies that users having a user role other than "doctor," "nurse," "assistant," "janitorial staff," or the like are not allowed access to the controlled location. Thus, the patient 1004, were he to approach the examination room alone, would not be allowed access due to the specified control rules.

In accordance with at least one embodiment, the doctor 1002 may be associated with the patient 1004. For example, access authority information of doctor 1002 may include the identification of the patient 1004 as being indicative of a person that the doctor 1002 may escort. In such an example, the access authority information of the doctor 1002 may override the access authority information of the patient 1004. Thus, though the patient 1004, who would not be allowed to access the examination room were he to attempt access alone, will not be able to access the examination room due to the presence of the doctor 1002.

In accordance with at least one embodiment, the doctor 1002 and the patient 1004 may, in some cases, have no prior association (e.g., the doctor 1002 is not associated with the patient 1004). In such cases, a component of the user-access controller 102 (e.g., the image processing engine(s) 520) may determine, via the image received from the image capture device(s) 108, that the doctor 1002 and the patient 1004 are within some distance 1012 apart. Distance measurements may be determined through analyzing a size of one person and a size of another person in the image. Additionally, or alternatively, points of reference (e.g., a door, painting, etc.), having known dimensions, may be utilized to determine a distance of a person in the image from the image capture device transmitting the image. For some cases, a distance 1012 of less than a threshold distance may be determined to be indicative of an "escort" situation. In other words, if the doctor 1002 and the patient 1004 are the distance 1012 apart, and the distance 1012 is less than some predefined distance threshold, then user-access controller 102 may allow the doctor 1002 to escort (e.g., override) the access authority information of the patient 1004. It should be understood that, in some cases, multiple user's access authority information may be ascertained and that, in some cases, if any of the multiple user's access authority information indicates that a user is allowed to access the controlled location, then all of the multiple user's within a threshold distance may be allowed to access the controlled location. In this manner, the doctor 1002 may escort one or more users into a controlled location.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodied instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A multi-user access system for a facility having a plurality of controlled locations with a corresponding plurality of image capture devices, the multi-user access system comprising:
    a data store, comprising:
    a first image of a first person, and
    a second image of a second person;
    an image capture device, wherein:
    the image capture device corresponds to a controlled location of the facility; and
    the image capture device transmits an image for the controlled location, wherein the image records a plurality of people;
    an image processor engine that:
    determines a plurality of sub-images corresponding to the plurality of people in the image, wherein the plurality of sub-images includes a first sub-image and a second sub-image, wherein the first sub-image corresponds to the first person, and wherein the second sub-image corresponds to the second person;
    compares the first sub-image to the first image of the first person;
    compares the second sub-image to the second image of the second person;
    determines, using a machine image processing algorithm, that the first sub-image matches the first image of the first person; and
    determines, using the machine image processing algorithm, that the second sub-image matches the second image of the second person;
    a user-access engine that:
    retrieves first information for the first person;
    retrieves second information for the second person;
    retrieves a control rule for the controlled location, wherein the control rule triggers an access condition for the first and second persons only when the first and second persons appear in the image together; determines that the first and second persons are allowed to access the controlled location, based on the first information, the second information and the control rule;
    and sends a signal indicating access availability to the controlled location for the first and second persons.

2. The multi-user access system for a facility having a plurality of controlled locations with a corresponding plurality of image capture devices of claim 1, the multi-user access system further comprising:
    a scheduling engine that:
    retrieves a first schedule for the first person;
    retrieves a second schedule for the controlled location;
    determines whether the first person is allowed to access the controlled location, wherein the determining is a function of the first schedule and the second schedule.

3. The multi-user access system for a facility having a plurality of controlled locations with a corresponding plurality of image capture devices of claim 1, the multi-user access system further comprising:
    a tracking engine that:
    obtains a plurality of images that individually record a number of people;
    determines a number of sub-images from the plurality of images;
    compares the number of sub-images to the first image of the first person;
    determines that the first image of the first person matches a subset of the number of sub-images; and
    calculates a potential location for the first person based on the matching subset of sub-images.

4. The multi-user access system for a facility having a plurality of controlled locations with a corresponding plurality of image capture devices of claim 3, wherein the tracking engine further:
    calculates a first confidence score that indicates that the first person is recorded in a first sub-image;
    calculates a second confidence score that indicates that the first person is recorded in a second sub-image;
    determines that the first person is recorded in the first sub-image as a function of the first confidence score and the second confidence score.

5. The multi-user access system for a facility having a plurality of controlled locations with a corresponding plurality of image capture devices of claim 4, wherein the signal sent indicating access availability to the controlled location restricts access to the controlled location based on the determination that the first person is recorded in the first sub-image.

6. The multi-user access system for a facility having a plurality of controlled locations with a corresponding plurality of image capture devices of claim 3, wherein the tracking engine further:
    receives, from a wrist-worn electronic device in real time, information of the first person indicating a location of the first person;
    associates the information of the first person indicating the location of the first person with the image for the controlled location of the facility; and
    stores the information of the first person indicating the location of the first person, the image for the controlled location of the facility, and the association.

7. The multi-user access system for a facility having a plurality of controlled locations with a corresponding plurality of image capture devices of claim 1, wherein the first information for the first person includes at least one of a controlled location that the first person is allowed to access, a controlled location that the first person is restricted from accessing, one or more people that the user is allowed to escort to a controlled location that the first person is allowed to access, and one or more people to which the first person is restricted from having access.

8. A method for managing user access of a facility having a plurality of controlled locations with a corresponding plurality of image capture devices, the method comprising:
- obtaining a two-dimensional image of a first person from a data store;
- obtaining a two-dimensional image of a second person from a data store;
- correlating an image capture device with a controlled location;
- receiving, from an image capture device, an image for the controlled location of the facility, the image recording one or more people;
- determining one or more sub-images corresponding to the one or more people in the image, wherein a first sub-image corresponds to the first person and a second sub-image corresponds to the second person;
- comparing at least one of the one or more sub-images to the two-dimensional image of the first person and the two-dimensional image of the second person;
- determining, using a machine image processing algorithm, that the first person and second person appear together in the image for the controlled location of the facility;
- retrieving information for the first person;
- retrieving information for the second person;
- retrieving a control rule for the controlled location, wherein the control rule triggers an access condition for the first and second persons only when the first and second persons appear in the image together;
- determining that the first person and the second person are allowed to access the controlled location, based on the information for the first person, the information for the second person, the control rule, and the determination that the first person and the second person appear together in the image; and based upon the immediately preceding determining, sending a signal indicating access availability to the controlled location for the first person and the second person.

9. The method for managing user access of a facility having a plurality of controlled locations with a corresponding plurality of image capture devices of claim 8, the method further comprising:
- obtaining a two-dimensional image of an additional person;
- comparing at least one of the one or more sub-images to the two-dimensional image of the additional person;
- determining, using a machine image processing algorithm, that the one or more people match the two-dimensional image of the additional person;
- retrieving information for the additional person;
- determining whether the additional person is allowed to access the controlled location, wherein the determining is a function of the information for the additional person and the control rule; and
- based upon the immediately preceding determining, sending a signal indicating access availability to the controlled location for the additional person.

10. The method for managing user access of a facility having a plurality of controlled locations with a corresponding plurality of image capture devices of claim 8, wherein the signal indicating access availability causes at least one of an elevator to be called, a door to be opened, a door to remain closed, an alarm to occur, or a notification to be sent.

11. The method for managing user access of a facility having a plurality of controlled locations with a corresponding plurality of image capture devices of claim 8, the method further comprising:
- generating tracking information of the first person, wherein generating the tracking information comprises:
- receiving a plurality of additional images for the facility;
- determining a plurality of sub-images of the plurality of additional images for the facility;
- comparing at least one of the plurality of sub-images to the two-dimensional image of the person; and
- determining, using a machine image processing algorithm, the at least one of the plurality of sub-images include the person based on the comparison.

12. The method for managing user access of a facility having a plurality of controlled locations with a corresponding plurality of image capture devices of claim 11, the method further comprising storing the tracking information of the first person.

13. The method for managing user access of a facility having a plurality of controlled locations with a corresponding plurality of image capture devices of claim 11, the method further comprising:
- receiving, from a Bluetooth beaconing device, location information of the first person; and
- calculating a potential location for the first person, wherein the potential location is calculated using the tracking information and the location information from the Bluetooth beaconing device.

14. The method for managing user access of a facility having a plurality of controlled locations with a corresponding plurality of image capture devices of claim 11, the method further comprising:
- receiving, from a wrist-worn electronic device, location information of the first person; and
- calculating a potential location for the first person, wherein the potential location is calculated using the tracking information and the location information from the Bluetooth beaconing device.

15. A method for managing multi-user access of a facility having a plurality of controlled locations with a corresponding plurality of image capture devices, the method comprising:
- obtaining a first image of a first person from a data store;
- obtaining a second image of a second person from the data store;
- correlating an image capture device with a controlled location;
- receiving, from the image capture device, an image for the controlled location of the facility, the image recording a plurality of people;
- determining a plurality of sub-images corresponding to the plurality of people in the image, wherein the plurality of sub-images includes a first sub-image and a second sub-image, wherein the first sub-image corresponds to the first person and the second sub-image corresponds to the second person;
- comparing the first sub-image to the first image of the first person;
- comparing the second sub-image to the second image of the second person;
- determining, using a machine image processing algorithm, that the first sub-image matches the first image of the first person;
- determining, using the machine image processing algorithm, that the second sub-image matches the second image of the second person;
- retrieving first information for the first person;
- retrieving second information for the second person;
- retrieving a control rule for the controlled location, wherein the control rule triggers an access condition for the first and second persons only when the first and second persons appear in the image together;

determines that the first and second persons are allowed to access the controlled location, based on the first information, the second information and the control rule; and based upon the immediately preceding determining, sending a signal indicating access availability to the controlled location for the first and second persons.

16. The method for managing user access of a facility having a plurality of controlled locations with a corresponding plurality of image capture devices of claim 15, the method further comprising:

receiving, from the image capture device, an additional image for an additional controlled location of the facility, the additional image recording an additional plurality of people and recorded at substantially a same time as the image;

determining an additional plurality of sub-images corresponding to the additional plurality of people in the additional image, wherein the additional plurality of sub-images includes a sub-image;

comparing the sub-image to the first image of the first person;

calculating, using a machine image processing algorithm, a confidence score that indicates that the sub-image matches the additional image of the first person;

determining that the first person is in the additional image and that the first person is absent from the image based on the confidence score.

17. The method for managing user access of a facility having a plurality of controlled locations with a corresponding plurality of image capture devices of claim 16, the method further comprising sending a notification based on the determination that the first person is in the additional image and that the first person is absent from the image.

18. The method for managing user access of a facility having a plurality of controlled locations with a corresponding plurality of image capture devices of claim 15, the method further comprising:

retrieving a first schedule for the first person;

retrieving a second schedule for the second person, wherein sending the signal is first based on the first schedule and the second schedule.

19. The method for managing user access of a facility having a plurality of controlled locations with a corresponding plurality of image capture devices of claim 15, the method further comprising:

determining a first location for the first person;

determining a second location for the second person;

determining a distance between the first location and the second location; and sending a notification to a remote computing device based on the determined distance.

20. The method for managing user access of a facility having a plurality of controlled locations with a corresponding plurality of image capture devices of claim 15, the method further comprising:

determining that the first person is designated as an escort for the second person;

determining that the first person is allowed access to the controlled location;

determining that the second person is restricted from having access to the controlled location; and allowing access to the controlled location based on the determination that the first person is designated as the escort for the second person and the determination that the first person is allowed access to the controlled location.

* * * * *